(12) United States Patent
Hammons et al.

(10) Patent No.: US 7,873,984 B2
(45) Date of Patent: Jan. 18, 2011

(54) NETWORK SECURITY THROUGH CONFIGURATION SERVERS IN THE FABRIC ENVIRONMENT

(75) Inventors: Richard L. Hammons, Hollister, CA (US); James Kleinsteiber, San Jose, CA (US); Hung Nguyen, San Jose, CA (US); Shankar Balasubramanian, Sunnyvale, CA (US); Vidya Renganarayanan, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 2804 days.

(21) Appl. No.: 10/066,251

(22) Filed: Jan. 31, 2002

(65) Prior Publication Data
US 2003/0163727 A1 Aug. 28, 2003

(51) Int. Cl.
*G06F 17/00* (2006.01)
(52) U.S. Cl. .................. 726/1; 726/2; 726/3; 726/6; 709/223; 709/224; 709/225
(58) Field of Classification Search ......... 709/223–225; 726/5, 1–3, 6
See application file for complete search history.

(56) References Cited

U.S. PATENT DOCUMENTS

| | | | |
|---|---|---|---|
| 5,422,953 A | 6/1995 | Fischer | |
| 5,473,599 A | 12/1995 | Li et al. | |
| 5,586,267 A | 12/1996 | Chatwani et al. | |
| 5,619,657 A | 4/1997 | Sudama et al. | |
| 5,694,615 A | 12/1997 | Thapar et al. | |
| 5,793,767 A | 8/1998 | Soda et al. | |
| 5,805,801 A * | 9/1998 | Holloway et al. | 726/22 |
| 6,052,456 A * | 4/2000 | Huang | 379/201.04 |
| 6,092,189 A * | 7/2000 | Fisher et al. | 713/1 |
| 6,393,484 B1 * | 5/2002 | Massarani | 709/227 |
| 6,574,629 B1 | 6/2003 | Cooke et al. | |
| 7,280,529 B1 | 10/2007 | Black et al. | |
| 7,457,279 B1 * | 11/2008 | Scott et al. | 370/352 |
| 7,707,278 B2 * | 4/2010 | Tafazolli et al. | 709/221 |
| 2002/0099937 A1 * | 7/2002 | Tuomenoksa | 713/153 |
| 2002/0174207 A1 * | 11/2002 | Battou | 709/223 |

(Continued)

FOREIGN PATENT DOCUMENTS

JP 02001-148697 5/2001

OTHER PUBLICATIONS

An Access-Based Clustering Protocol for Multihop Wireless Ad Hoc Networks, Ting-Chao Hou et al, Jul. 2001.*

(Continued)

*Primary Examiner*—Kambiz Zand
*Assistant Examiner*—Amare Tabor
(74) *Attorney, Agent, or Firm*—Wong, Cabello, Lutsch, Rutherford & Brucculeri, L.L.P.

(57) ABSTRACT

A network configuration device or entity has control of defined management and security functions in the network, or in many embodiments, in a Fiber Channel fabric. The network configuration device may control many functions. Foremost, it may control the recognition, operation and succession procedure for network configuration entities. It may also control user configurable options for the network, rules for interaction between other entities in the network, rules governing management-level access to the network, and rules governing management-level access to individual devices in the network. In addition, the network configuration entity may exploit policy sets to implement its control.

22 Claims, 17 Drawing Sheets

| Step # | Name / Function | Payload |
|---|---|---|
| 1 | Request Authentication | Secret Fact A |
| 2 | Acknowledge Request | Secret Fact B; Type 1 derivative of Secret Fact A; InfoB; Type 3-4 derivative of Info B |
| 3 | Confirm Authentication | Type 2 derivative of Secret Fact B; InfoA; Type 3-4 derivateve of InfoA |
| | | |

U.S. PATENT DOCUMENTS

| | | | |
|---|---|---|---|
| 2003/0014548 A1* | 1/2003 | Valentine et al. | 709/252 |
| 2003/0028624 A1 | 2/2003 | Hasan et al. | |
| 2003/0076846 A1 | 4/2003 | Heinz et al. | |
| 2003/0105881 A1* | 6/2003 | Symons et al. | 709/249 |
| 2003/0208589 A1* | 11/2003 | Yamamoto | 709/224 |
| 2004/0015957 A1* | 1/2004 | Zara et al. | 717/174 |
| 2004/0243547 A1 | 12/2004 | Chatrapati et al. | |

OTHER PUBLICATIONS

Daley, William M. "Entity Authentication Using Public Key Cryptography." US Dept. of Commerce/ National Institute of Standards and Technology. (Feb. 18, 1997) 1-50.

Schneier, Bruce. "Applied Cryptography, Second Edition." John Wiley and Sons (1996) 37-39, 185-187, & 574-576.

"Fibre Channel—Methodologies for Interconnects (FC-MI) Rev 1.8;" NCITS working draft proposed Technical Report 2001; Secretariat: Information Technology Industry Council; pp. 19-30; 41-44.

"Fibre Channel—Fabric Generic Requirements (FC-FG)" 1996; American National Standards Institute; pp. 6-21.

"Fibre Channel— Generic Services (FC-GS) Rev 3.1;" 1996; working draft proposed American National Standard for Information Systems; pp. 41-49.

"Fibre Channel—Generic Services—2 (FC-GS-2);" 1999; American National Standards Institute; pp. 43-51 and 69-79.

"Fibre Channel—Generic Services—3 (FC-GS-3);" 2001; Approved American National Standard; pp. 93-165.

"Fibre Channel—Generic Services—4 (FC-GS-4) Rev 7.1;" 2001; NCITS working draft proposed American National Standard for Information Technology; pp. 95-139 and 172-177.

"Fibre Channel—Switch Fabric (FC-SW) Rev 3.3;" 1997; NITS working draft proposed American National Standard for Information Technology; pp. 9-17 and 49-63.

"Fibre Channel—Switch Fabric—2 (FC-SW-2) Rev 5.3;" 2001; NCITS working draft proposed American National Standard for Information Technology; pp. 11-21 and 69-95.

"Fibre Channel—Framing and Signaling (FC-FS) Rev 1.7;" 2002; NCITS working draft proposed American National Standard for Information Technology; pp. 28-31 and 282-298.

"Fibre Channel—Physical and Signaling Interface (PC-PH) Rev 4.3;" 1994; working draft proposed American National Standard for Information Systems; pp. 15-25 and 248-259.

Final Office Action mailed Sep. 24, 2009 for corresponding U.S. Appl. No. 11/269,437.

Response to Final Office Mailed Sep. 24, 2009 for corresponding U.S. Appl. No. 11/269,437, filed Dec. 22, 2009.

Office Action mailed Apr. 6, 2009 for corresponding U.S. Appl. No. 11/269,331.

Response to Office Action mailed Apr. 6, 2009 for corresponding patent U.S. Appl. No. 11/269,331, filed Jul. 6, 2009.

Final Office Action mailed Oct. 27, 2009 for corresponding U.S. Appl. No. 11/269,331.

Failover. (1999). In Dictionary of Multimedia and Internet Applications: A Guide for Developers and Users. Retrieved from http://www.credoreference.com/entry/wdmia/failover.

Office Action mailed Apr. 13, 2009 for corresponding U.S. Appl. No. 11/269,365.

Response to Office Action mailed Apr. 13, 2009 for corresponding U.S. Appl. No. 11/269,365, filed Jul. 8, 2009.

Final Office Action mailed Oct. 28, 2009 for corresponding U.S. Appl. No. 11/269,365.

* cited by examiner

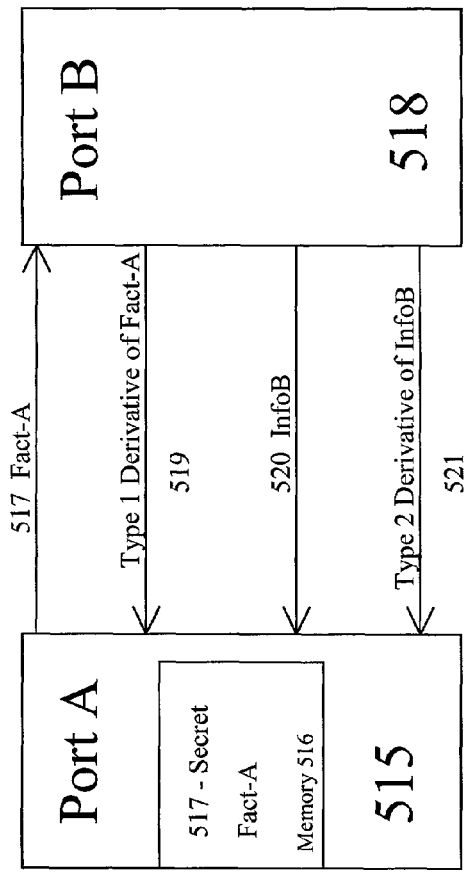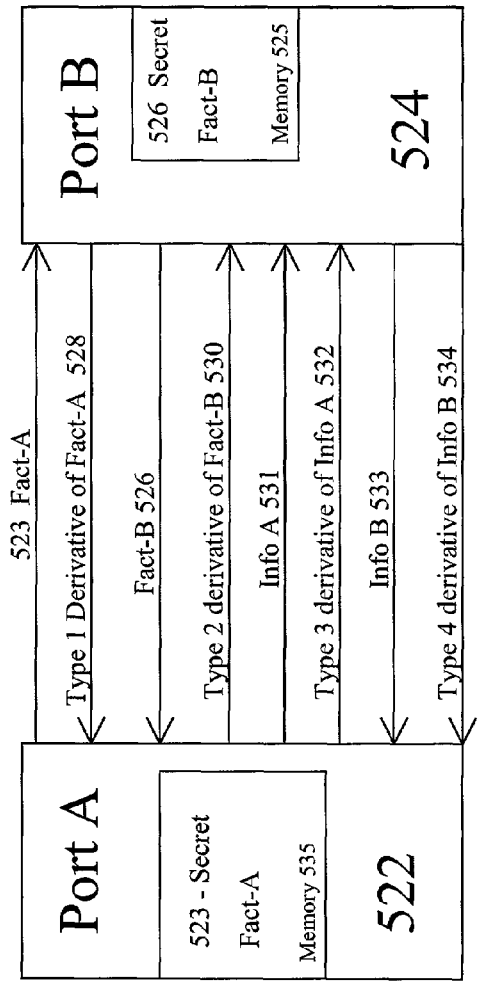
Figure 5c
Figure 5d

| Step # | Name / Function | Payload |
|---|---|---|
| 1 | Request Authentication | Secret Fact A |
| 2 | Acknowledge Request | Secret Fact B; Type 1 derivative of Secret Fact A; InfoB; Type 3-4 derivative of Info B |
| 3 | Confirm Authentication | Type 2 derivative of Secret Fact B; InfoA; Type 3-4 derivateve of InfoA |

Figure 6

| Step # | Name / Function | Payload |
|---|---|---|
| 1 | Request Authentication | Secret Fact A; InfoA; Type 3-4 derivateve of InfoA |

| Step # | Name / Function | Payload |
|---|---|---|
| 1 | Acknowledge Request | Secret Fact B; Type 1 derivative of Substitute Secret Fact A; InfoB; Type 3-4 derivative of Info B |
| 2 | Confirm Authentication | Type 2 derivative of Secret Fact B; InfoA; Type 3-4 derivateve of InfoA |

Figure 8

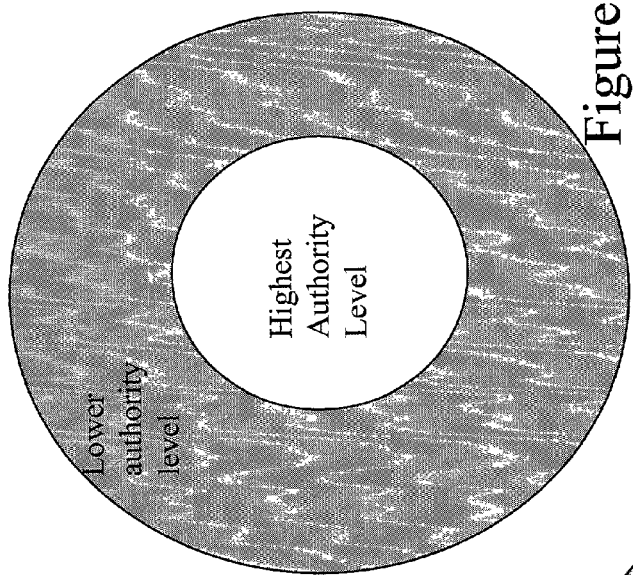
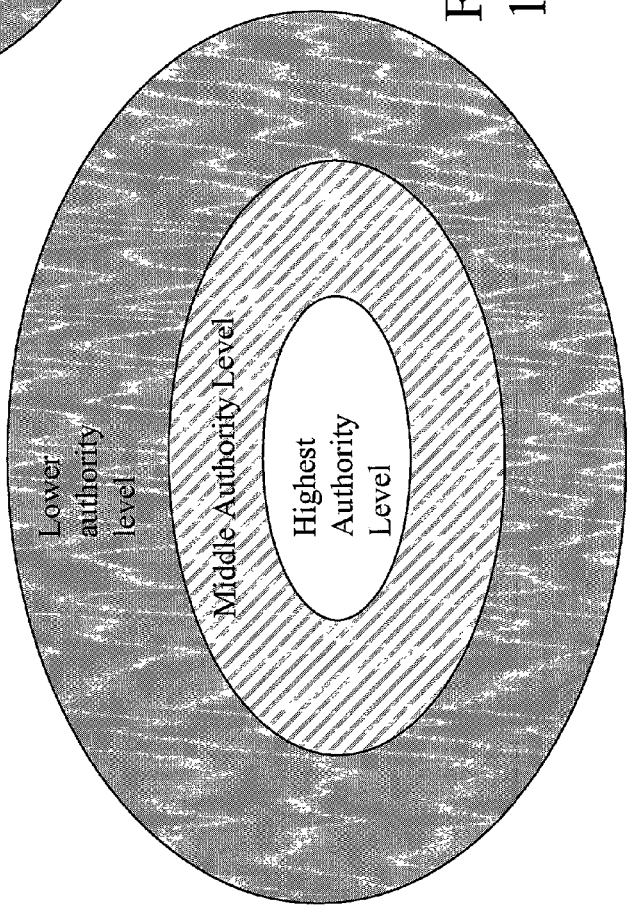
Figure 11a
Figure 11b
Figure 11c

NETWORK SECURITY THROUGH CONFIGURATION SERVERS IN THE FABRIC ENVIRONMENT

BACKGROUND OF THE INVENTION

Field of the Invention

The invention relates to security in switching and routing environments and more specifically to serial point-to-point switching environments such as the Fibre Channel switching environment. The invention also relates to the architecture of network switching environments and the control of security in such an environment. Furthermore, the invention relates to authentication and time services in the area of security.

The past two decades have witnessed the rapid evolution and deployment of information technology. This evolution resulted in a more ubiquitous presence of information handling systems including systems for information storage, management, transport and access. The rapid development of the Internet has contributed materially to this ubiquitous information age by allowing single and possibly remote access points to interact with world-wide networks and unprecedented masses of information. This trend of information ubiquity and dispersion is likely to continue.

One of the problems born with the spread of information is the issue of security. In the modern world, there are several aspects to information security. In a very general sense these aspects include the following: physical security; communications security, emissions security; computer security; and network security. Physical security involves the physical protection of hard assets such as books or machines (including, of course, all manner of computers). Physical security systems are designed to protect the physical integrity of things and physical security is commonly implemented by denying access to those things. Communication security is concerned with the logical protection of information when in transit. Communication security systems should protect information even if physically in the hands of someone unauthorized. A common communication security technique is encryption. Emissions security is concerned with the protection of signal emissions from an electric system. A common manner to implement emissions security is through limiting emissions. Computer security is used to control access to computer systems and information, which is commonly done by defining what users (including programs and devices) can access what other users (also including programs and devices). Finally, network security is primarily concerned with securing the local network from elements that are outside the local network yet physically or logically connected.

In the past, the solution for information security may have resulted in locking a mainframe safely in a room with limited access. In the 1990's the problem of effectively securing information became more difficult as the popularity of personal computers, the availability of high speed, inexpensive modems and the popularity of the Internet combined to not only increase the number of computer security incidents, but also increase the severity of the incidents.

Information security is now more significant issue facing today's electronic society. As the information highway transcends borders, locked doors are no longer sufficient to protect one of the corporation's most valuable assets—information. Furthermore, the ubiquitous, low-cost nature of the Internet has caused an explosion in e-business and e-commerce activity, creating a paradigm shift in the business world. However, in implementing IT infrastructures under the new paradigm, companies and individuals must be realistic about deploying security measures) minimizing risk and choosing security solutions that will allow flexibility, growth, and provide the proper balance for the corporate security strategy and policy.

In the modern science of information security, systems may be analyzed by their vulnerability to defined "attacks." Specific types of attacks are generally defined with reference to specific systems so there are a virtually unlimited number of attack types. However, most all attack types fall into four categories. The first very general type of attack is an access attack, which is simply an effort to gain unauthorized access to information thereby compromising the secrecy of the information. The second type of attack is the repudiation attack where the attacker provides false information to the system such as by claiming to have sent a message only once, when the attacker actually sent the message twice. Repudiation (or providing false information) should be contrasted from providing inaccurate data, which is a modification attack. A modification attack (the third very general type of attack) occurs when the attacker attempts to modify information without authorization thereby compromising the integrity of the information. The fourth very general type of attack is the service-denial attack. This type of attacker attempts to deny authorized users access to information or systems. This is commonly done by flooding a system with unauthorized requests.

The inventions disclosed herein are born in the Fibre Channel ("FC") switching area. Historically Fibre Channel has been a loose security environment. In particular, when a FC switch connects to an FC fabric, the switch automatically has full authority in the fabric. Full authority means that the switch potentially has access to everything connected to or through the Fibre Channel fabric. This automatic authorization creates security vulnerabilities in the system that may not apply in other systems. As such, the innovations discussed herein were born with a somewhat specific set of problems (although still very general). Although well known to the artisan, those problems will now be briefly listed: (i) administrative access control and the lack of granularity in management access; (ii) "spoofing," which is when a device gains access to unauthorized resources using an identification that is not genuine or authentic; (iii) unauthorized access to a device on the network may easily yield unauthorized access to the network and important information such as passwords, encryptions keys, identification credentials, etc.; (iv) unauthorized access by one tenant to another tenant's resources in multi-tenant or shared environments, such as ASPs; (v) computing devices placed on the network to pretend to be a different kind of device, such as a switch; (vi) unauthorized access through the device ports such as front panel controls or I/O ports (e.g. the serial port (RS232)); (vii) unauthorized applications clogging the network by sending out a high volume of dummy management messages or I/Os to resources on the network: (viii) unauthorized analysis on the communication lines to learn about management or data traffic; and (ix) the protection of passwords during transmission over the network.

Generally, there are several desirable attributes of a security system. At a very high level, the following list is illustrative: (i) ease of manageability; (ii) scalability; (iii) allowing for accountability; (iv) interoperability, potentially through standards; (v) strong authentication; (vi) strong confidentiality, such as encryption techniques with automatic key management; and (vi) ease of use.

The innovations discussed herein address many of the aforementioned concerns using techniques and apparatus significantly advanced from the prior arts.

SUMMARY OF THE INVENTION

In a specific sense, the inventions disclosed herein seek to solve the problems created by the absence of standardized methods and apparatus for handling security in a Fibre Channel network. In a general sense, the inventions described herein propose a variety of ways to enhance security in a networking environment. There are several inventive methods and apparatus, and they may be deployed singularly or in various combinations.

One high-level aspect of the invention is an intelligent entity in the network with defined and essentially exclusive responsibility for network management and security functions. By focusing management responsibility on a single device, network designers and operators can better secure the network by limiting physical access to that device. Of course, logical access to such a device might occur from anything in the network or connected to the network. Therefore, the invention envisions various mechanisms for controlling and limiting logical access. One such technique is the use of management access controls. Specifically, that is using policy sets to give network operators the ability to specifically designate logical channels from which security and management instructions may originate. For example, an operator may disable serial port access, front panel access or HTTP access for the purposes of management or security changes. Another technique for limiting management access and enhancing security is to specifically designate which devices can send or receive information to which other devices. For example, a device should operate under control that will not permit use or forwarding of received information if the information source is not an authorized source.

Furthermore, the invention describes other security innovations, in addition to focused network management and limitation of network management channels. A primary example is the description of a novel link authentication system. More particularly, this system enables port level authentication so that a port (or the system controlling it) can have a high degree of confidence that the port on the other side of its link is authentic (i.e. it is what it says it is). In addition to port authentication, the invention offers a unique system for securely distributing time service in a network according to a push model. This is contrasted to the pull model that pervades standard Fibre Channel networking.

Finally, the invention contemplates the combination of these techniques as well as the innovative use of encryption technologies to form a cohesive security scheme in the network. For example, one embodiment of the invention may comprise a configuration server that is responsible for a defined set of management and security functions in the network. That same configuration server may operate as a focal point for distribution of secure time service and use one of the inventive port authentication systems of the invention. Many other permutations may be constructed by simply the various concepts in the manner suggested herein.

A more complete summary of each aspect of the invention now follows.

In implementing network security, one aspect of the invention calls for varying degrees of hierarchical control. In particular, an embodiment exploiting this aspect of the invention will designate which devices may perform designated security or management functions. This designation bears on hierarchical control in that devices with larger designation of responsibility are higher on the chain of hierarchical control. Less generally, one aspect of the invention contemplates a network configuration entity that is responsible for defined security and management functions in the network. By so limiting which devices allow access to management and security functions, the logical security of the entire network may be enhanced by providing greater physical security for such a network configuration entity. In practice, network operators (who presumably configure and operate networks) may maintain logical network security while deploying devices in both secure and non-secure physical locations. That is the ability to locate network equipment in buildings, rooms or cabinets with varying degrees of physical security as long as the network configuration entity is located in an area of sufficient physical security. In certain embodiments of the invention, equipment residing in less secure physical environment should present logical security barriers for effecting the network. To achieve that goal, certain embodiments of the invention allow network operators to determine the specific devices that may facilitate management-level access to the network. In addition, network-wide login names and passwords may be used to protect from new equipment that may be added in a non-secure network-accessible location. For example, using an embodiment of the invention, an operator would configure a switch in a non-secure physical location so that no network management access is possible. In addition, network-wide passwords and login names help limit the ability to set up new equipment for unauthorized access to the network or its management functions.

Another aspect of the invention involves security over the logical management channels by providing confidentiality or information security for certain management information being passed over the network. For example, when logging on over a management channel, the login and password information is exchanged. Certain embodiments of the invention call for the encryption or other secreting of this type of information.

Yet another aspect of the invention involves logical access to management controls by allowing the operator to limit the use of the various logical management access channels. For example, an operator may configure management access to be limited to SNMP from only one particular source. Alternatively, the operator can define which logical channels (e.g. telnet, HTTP, SES, serial port etc.) may be used for access to the network. In a preferred embodiment, this limitation of access is effected by distribution of policy sets throughout the network. In one such embodiment, for example, there is a policy set for front panel access. The policy defines which entities in the network may obtain valid information from an operator using the front panel. If a specific entity is not properly identified in the front panel MAC ("management access control") policy, then that entity's front panel will be disabled.

Another security and management tool contemplated by the invention involves device or entity connection controls, which allow the operators to specify what devices or entities are allowed in the network and potentially what entities are allowed access to what other entities in the network. This concept can further extend to allowing for operator definition of which ports or nodes may communicate with which other ports or nodes. These types of controls can limit unauthorized access to the network because unauthorized devices will be unable to access the network. This is because no device, port or node on the network is permitted to communicate with an unknown device, port or node.

Yet another aspect of the invention is link authentication, which provides apparatus and techniques for authenticating point-to-point connections between ports ("links") so that the device owning each port can efficiently verify the identity and credentials of the port on the opposite side of the link. This is very useful because all data transfer integrity is compromised if the receiver of a sent communication is not who or what it says it is.

The final general aspect is the invention is secure time service, which provides apparatus and techniques for enhancing security and substantive operations by ensuring secure and uniform timekeeping across the network. For example, reliable time stamps provide additional verification abilities for communications because they allow latency, interval, and sequencing analysis.

Of course, the combination and specific implementations of these invention, as described, provide further levels of innovations. For example, in a preferred embodiment combining the various aspects of the invention, many of the functions may be implemented by use of policy sets or lists deployed to each device in the network.

BRIEF DESCRIPTION OF THE DRAWINGS

A better understanding of the invention can be had when the following detailed description of the preferred embodiments is considered in conjunction with the following drawings, in which:

FIG. 5c shows another approach for authentication.

FIG. 5d shows an approach for mutual link authentication.

FIG. 6 shows an embodiment for sequencing of a mutual link authentication.

FIG. 7 shows an embodiment for sequencing of a mutual link authentication.

FIG. 8 shows a two-step mutual authentication.

FIG. 11a shows a single-level management hierarchy.

FIG. 11b shows a two-level management hierarchy.

FIG. 11c shows a three-level management hierarchy.

DESCRIPTION OF THE PREFERRED EMBODIMENT

Titles and subtitles used in the text are intended only as focal points and an organization tool. These titles are not intended to specifically describe the applicable discussion or imply any limitation of that discussion. Furthermore, in the following description, for purposes of explanation, numerous specific details are set forth in order to provide a thorough understanding of the invention. It will be apparent, however, to one skilled in the art that the invention can be practiced without these specific details. In other circumstances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

I. The Network Context

Figure 1:
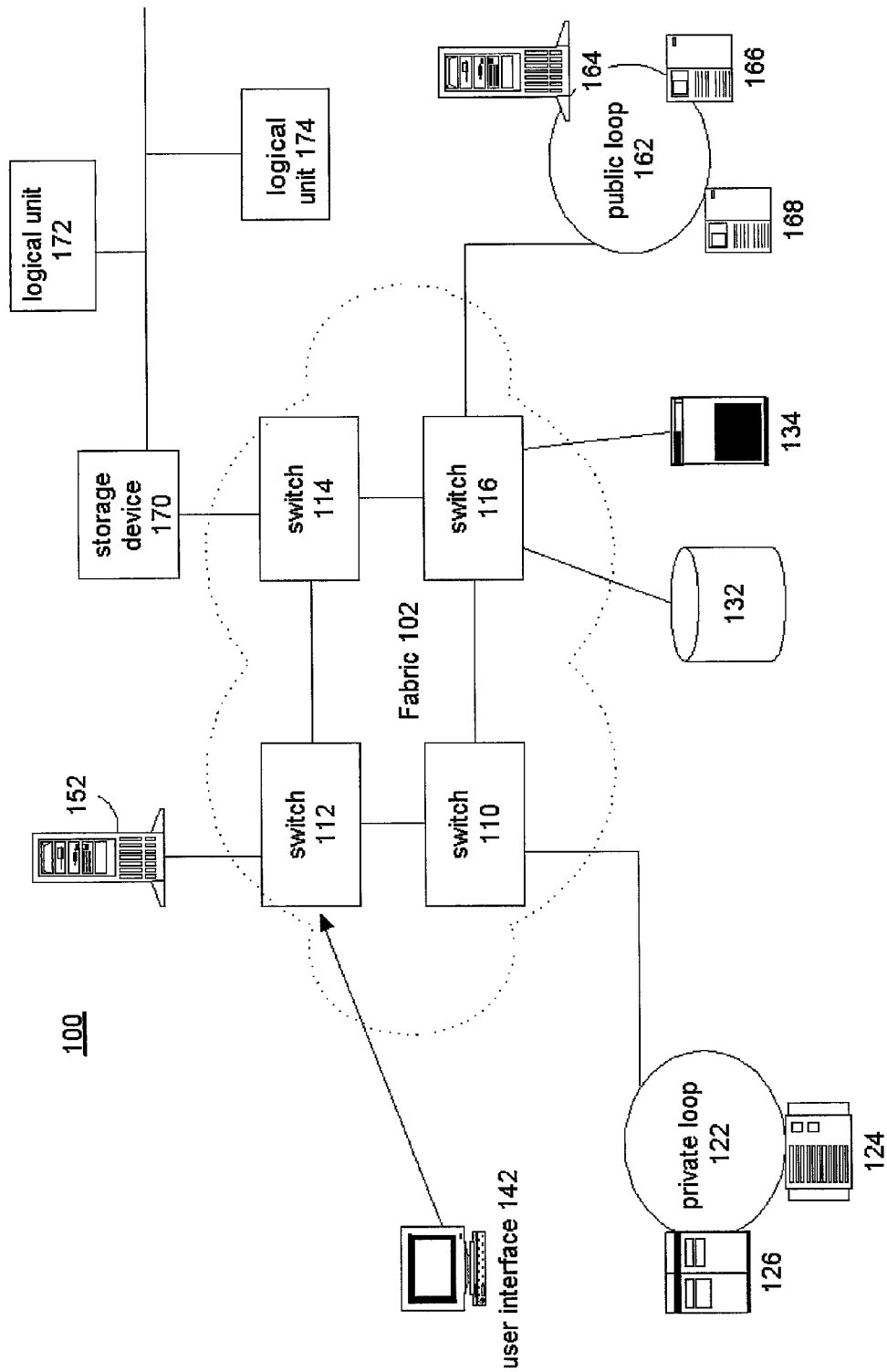
FIG. 1 is a network including a Fibre Channel fabric or switched environment.

Referring to FIG. 1, a network 100 is shown including a Fibre Channel ("FC") fabric 102 coupled with several elements and sub-networks. In the specific network shown, the heart of the communications system is Fibre Channel. However, the inventions discussed herein are not necessarily limited to Fibre Channel networking or configurations. In the context of security, many of the problems solved by the current inventions may apply to all forms of communications including, without limitation, IP networks.

FIG. 1 illustrates a Fibre Channel network 100 according to the present invention. Generally, the network 100 is connected using Fibre Channel connections (e.g., optical fiber, coaxial cable, and twisted pair connections). In the embodiment shown and for illustrative purposes, the network 100 includes a fabric 102 comprised of four different switches 110, 112, 114, and 116. It will be understood by one of skill in the art that a Fibre Channel fabric may be comprised of one or more switches.

A variety of devices can be connected to the fabric 102. A Fibre Channel fabric supports both point-to-point and loop device connections. A point-to-point connection is a direct connection between a device and the fabric. A loop connection is a single fabric connection that supports one or more devices in an "arbitrated loop" configuration, wherein signals travel around the loop through each of the loop devices. Hubs, bridges, and other configurations may be added to enhance the connections within an arbitrated loop.

On the fabric side, devices are coupled to the fabric via fabric ports. A fabric port ($F_{13}$Port) supports a point-to-point fabric attachment. A fabric loop port ($FL_{13}$Port) supports a fabric loop attachment. Both $F_{13}$Ports and $FL_{13}$Ports may be referred to generically as $Fx_{13}$Ports. Typically, ports connecting one switch to another switch are referred to as expansion ports ($E_{13}$Ports).

On the device side, each device coupled to a fabric constitutes a node. Each device includes a node port by which it is coupled to the fabric. A port on a device coupled in a point-to-point topology is a node port ($N_{13}$Port). A port on a device coupled in a loop topology is a node loop port ($NL_{13}$Port). Both $N_{13}$Ports and $NL_{13}$Ports may be referred to generically as $Nx_{13}$Ports. The label $N_{13}$Port or $NL_{13}$Port may be used to identify a device, such as a computer or a peripheral, which is coupled to the fabric.

Loop devices ($NL_{13}$Ports) coupled to a fabric may be either "public" or "private" devices that comply with the respective Fibre Channel standard (e.g., Fabric Loop Attach standard FC-FLA, or Fibre Channel Private Loop Direct Attach FC-PLDA, respectively). Those skilled in the art will be familiar with the configurations for enabling public and private devices to operate in compliance with ANSI specifications (e.g., X3.272 1996; T11 project 1133-D) and the NCITS specification (e.g., NCITS TR-20 1998; NCITS TR-19 1998).

Typically, private loop devices cannot log into an attached fabric and are thus incapable of communicating with other fabric devices. However, a well-suited method for allowing private loop devices to communicate with public fabric-attached devices is disclosed in commonly assigned U.S. patent application Ser. No. 09/370,095, entitled "System and Method for Sending and Receiving Frames Between a Public Device and a Private Device," by Stai, et al., filed on Aug. 6, 1999, the subject matter of which is herein incorporated by reference in its entirety. In general, private addresses reside at the "end points" of the fabric, and upon entering a loop, frames having the format of the private address are transformed to a format associated with a public address. This implies that there is a representation of private traffic in a public format when a frame navigates through a loop.

In the embodiment shown in FIG. 1, fabric 102 includes switches 110, 112, 114 and 116 that are interconnected. Switch 110 is attached to private loop 122, which is comprised of devices 126 and 124. Switch 112 is attached to device 152. Switch 114 is attached to device 170, which has two logical units 172, 174 attached to device 170. Typically, device 170 is a storage device, which in turn may be coupled to additional individual hard disks represented as logical units (i.e., 172 and 174). Switch 116 is attached to devices 132 and 134, and is also attached to public loop 162, which is formed from devices 164, 166 and 168 being communicatively coupled together. A user interface 142 also connects to the fabric 102 through switch 112.

II. Explaining the Switch

While the inventions herein are not necessarily limited to Fibre Channel networks, the implementations and embodiments center around developments in the Fibre Channel world. Therefore, in order to more fully appreciate the inventions, some discussion of an exemplary Fibre Channel switch may be useful.

Figure 2:
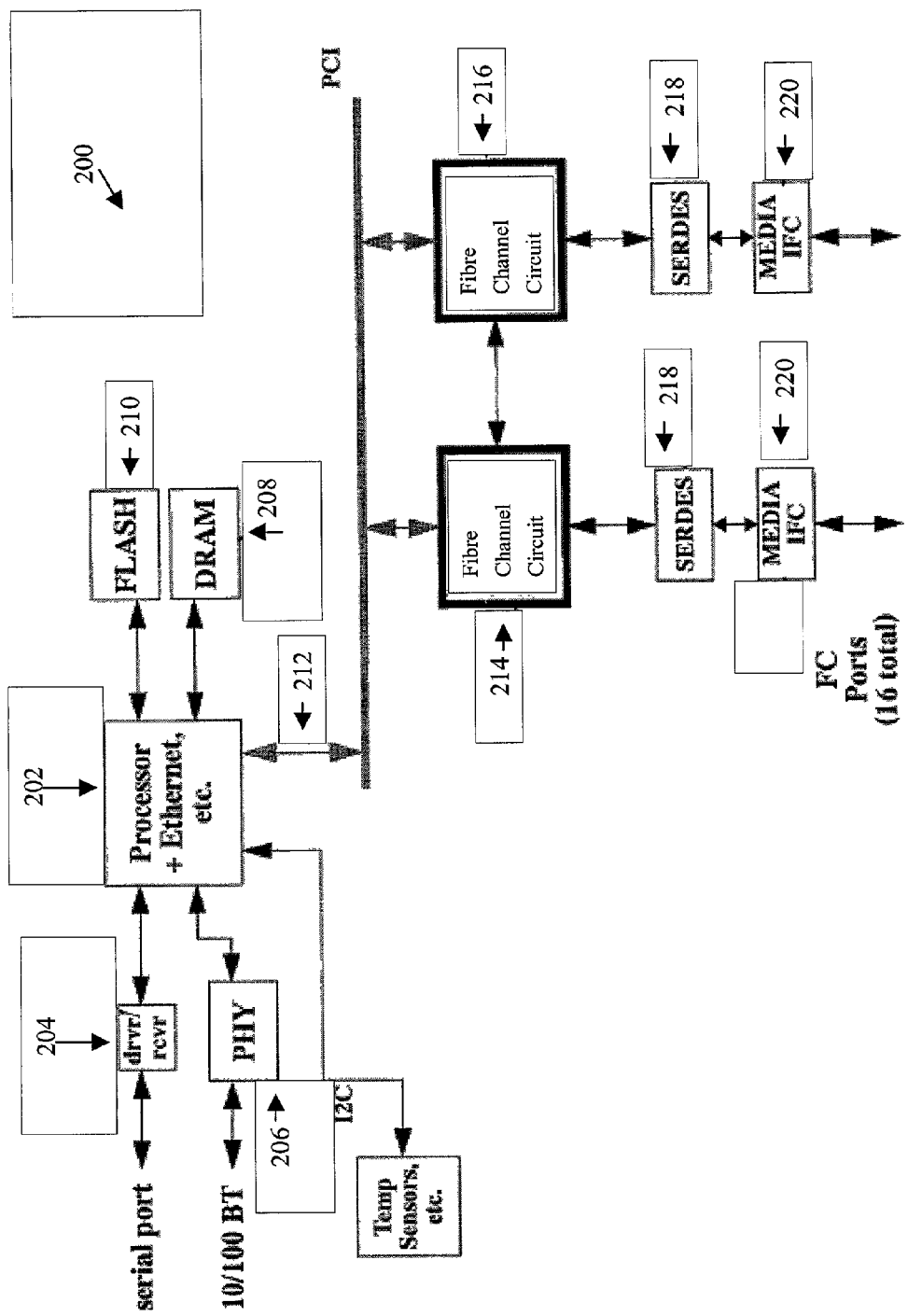
FIG. 2 is a hardware configuration of a switch.

FIG. 2 illustrates a basic block diagram of a switch 200, such as switches 110, 112, 114 or 116, according to the preferred embodiment of the present invention. A processor and I/O interface complex 202 provides the processing capabilities of the switch 200. The processor may be any of various suitable processors, including the Intel i960 and the Motorola PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210 are connected to the processor complex 202 to provide memory to control and be used by the processor.

The processor complex 202 also includes an I/O bus interface 212, such as PCI bus, to connect to Fibre Channel circuits 214 and 216. The Fibre Channel circuits 214, 216 in the preferred embodiment each contain eight Fibre Channel ports. Each port is connected to an external SERDES circuit 218, which in turn is connected to a media interface 220, which receives the particular Fibre Channel medium used to interconnect switches used to form a fabric or to connect to various devices.

III. Securing a Network

A. Securing a Network: Generally

While the invention includes several individual techniques for achieving differing aspects of network security, the invention includes an overall architecture and sub-architectures for securing a network. At a very high level, the inventive security architecture comprises six aspects: (i) physical access to management functions; (ii) security over the logical management channels; (iii) logical access to management controls; (iv) device or entity connection controls; (v) link authentication; and (vi) security time service.

The first aspect, physical access to management functions, generally involves enabling the network operators (who presumably configure and operate networks) to use network equipment in both secure and non-secure physical locations. That is the ability to locate network equipment in buildings, rooms or cabinets with varying degrees of physical security. In certain embodiments of the invention, equipment residing in less secure physical environment should present security barriers for effecting the network. To achieve that goal, certain embodiments of the invention allow network operators to determine the specific devices that may facilitate management-level access to the network. In addition, network-wide login names and passwords may be used to protect from new equipment that may be added in a non-secure location. For example, using an embodiment of the invention, an operator would configure a switch in a non-secure physical location so that no network management access is possible. In addition, network-wide passwords and login names help limit the ability to set up new equipment for unauthorized access to the network or its management functions.

The second aspect, security over the logical management channels, involves providing confidentiality or information security for certain management information being passed over the network. For example, when logging on over a management channel, the login and password information is exchanged. Certain embodiments of the invention call for the encryption or other secreting of this type of information.

The third aspect, logical access to management controls, involves allowing the operator to limit the use of the various logical management access channels. For example, an operator may configure management access to be limited to SNMP from only one particular source.

The fourth aspect, device or entity connection controls, involves allowing the operators to specify what devices or entities are allowed in the network and potentially what entities are allowed access to what other entities in the network. For example, generally, these types of controls can limit unauthorized access to the network because unauthorized devices are not allowed on the network and authorized devices are only allowed to communicate to specified other devices.

The fifth aspect, link authentication, provides apparatus and techniques for authenticating point to point connections between ports ("links") so that the device owning each port can efficiently verify the identity and credentials of the port on the opposite side of the link. This is necessary because all data transfer integrity is compromised if the receiver of a sent communication is not who or what it says it is.

The sixth aspect, security time service, provides apparatus and techniques for enhancing security and substantive operations by ensuring secure and uniform timekeeping across the network. For example, reliable time stamps provide additional verification abilities for communications because they allow latency, interval, and sequencing analysis.

Each of these six aspects will be explained further. The explanations are first conceptual and illustrative of the innovative techniques. In addition, to the extent appropriate, the conceptual explanations are followed by implementation details or examples. Some of the implementation details or examples will discuss "policies," which are essentially lists used as rules or procedure restrictions in a computing environment and specifically in a Fibre Channel switching environment.

Since the innovations discussed herein grow out of Fibre Channel switching, many of the examples and implementation details will stem from that environment.

B. Securing a Network: The Fabric

As discussed throughout, the following discussion arises in a FC environment and discusses switches. However, the inventions may apply outside that environment and to any network connected devices.

In an FC fabric, many aspects of device and network control are managed through the use of policy sets. In particular, the invention envisions a variety of security policy sets, with each set targeted at a specific component of the overall fabric security structure. The security policy sets under the invention involve specifying and controlling the access to fabric management capabilities and controlling the physical components in the fabric as well as their connections within the fabric. In order to be most effective, the policies must be enforced throughout the fabric. This is because even one non-secure device or switch may create an opening that compromises the security of the entire fabric. Therefore, most embodiments require that, in order to use the security policies, all members of the fabric must be enabled to operate with the security policies. In order to effect this, many embodiments of the invention supply a management command ("SecModeEnable") to turn security on or off fabric-wide. Since most effective security requires fabric-wide participation, in those embodiments, the SecModeEnable command will fail if there are devices in the fabric that are not capable.

Regarding the activation of secure mode, throughout the discussion, when mentioning secure mode "active," "on," "off" or "enabled," or the like, the general reference is to the active enabling of security throughout the fabric. The actual security functions and policies enabled will be determined by the specifics or context of the discussion.

In some embodiments, the SecModeEnable command must be accompanied by a list of one or more switches identities. The switch identifies designate switches that will become fabric configuration servers ("FCS"), which are explained in detail later. Switch identities are usually specified using world-wide-names ("WWNs"). The SecModeEnable command will also cause the creation of default policy sets to be distributed to all the switches in the fabric. In some embodiments, a switch serving as the primary FCS will control that distribution and the activation of the security function. In many embodiments, the policies are recognized in two categories, active policies (those currently being enforced) and defined policies (defined policies are copies of the policies that have been created/modified and saved. Active policies are set from defined policies). In such embodiments, when a switch is rebooted, only the saved set of active policies are enforced. However, generally, when security is activated, all security policies are enforced. Lastly, in some embodiments, secure mode may not be activated unless the fabric is time synchronized (distributed time synchronization is discussed later)

IV. Physical Access to Management Functions

As discussed earlier, this aspect involves apparatus and techniques that reduce the risk of locating network devices in physically non-secure environments. These apparatus and techniques allow the network operator to restrict management operations to switches or other devices that are physically secure, perhaps at a central site. The features further provide the ability to prevent network (or fabric) management access in sites where security may be weaker (perhaps a remote site). However, this predicate is general in nature and, in any event, is not intended to limit the application of the innovations discussed herein.

A. Physical Access to Management Functions: Generally

Figure 10:
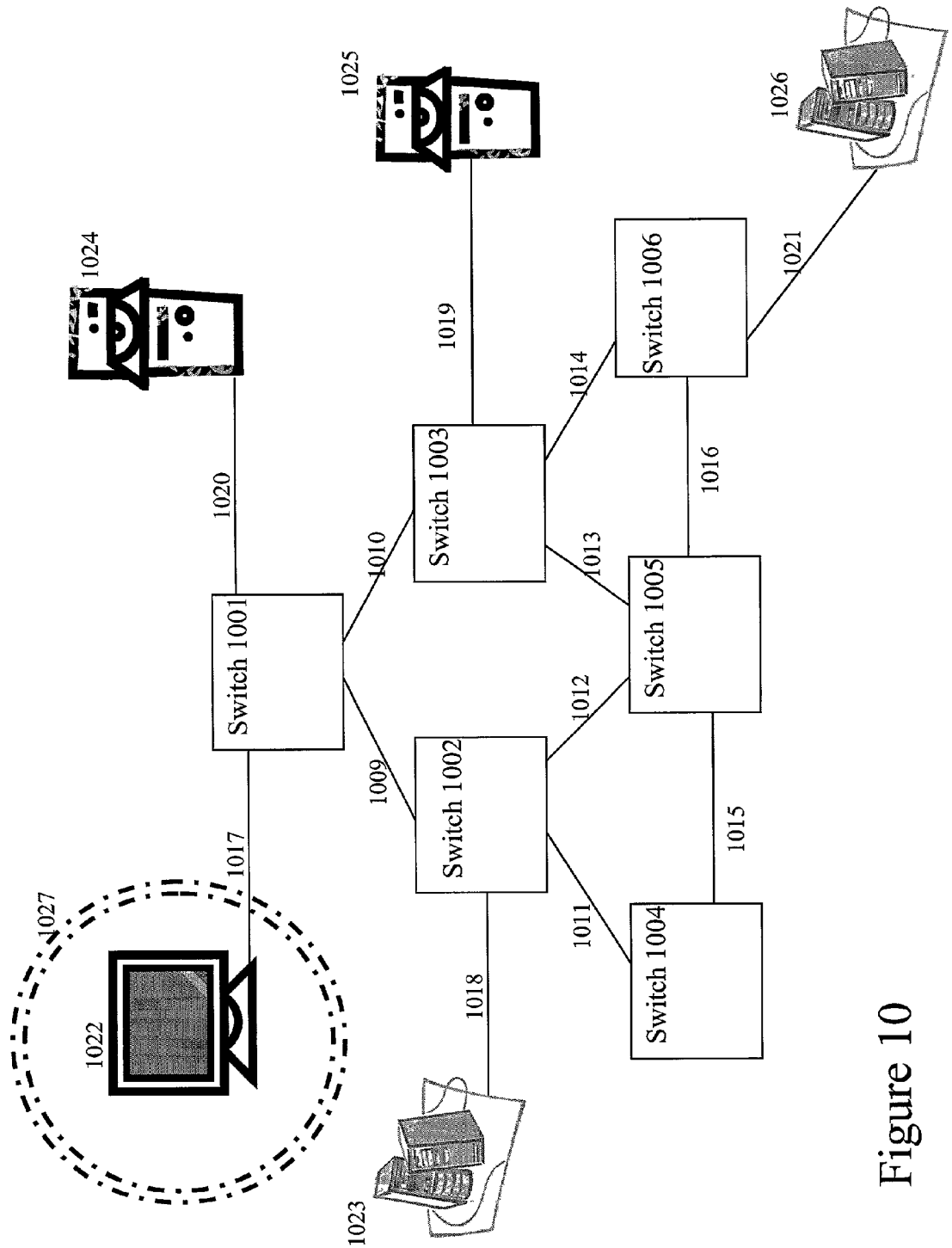
FIG. 10 is a network of switching and/or routing entities.

In implementing security in a network, the invention contemplates varying degrees of hierarchical control. In particular, each entity may have some security responsibilities and authority but some will have more than others. This is contrasted with a system where all entities in the network have authority in rough equivalence. Referring to FIG. 10, there is shown a network of switching and/or routing entities 1001, 1002, 1003, 1004, 1005 and 1006. There is also shown computer terminal 1022, first server 1024, second server 1025, first storage entity 1026 and second storage entity 1023. As explained earlier, any number of elements may connect to the network for any variety of purposes.

Referring again to FIG. 10, some embodiments of the invention use a Network Configuration Entity ("NCE"), which is a single intelligent entity in the network to control many security functions. In some embodiments, computer terminal 1022 may be the NCE for the network shown and as such will control a defined set of security and management functions in the network. The defined set of security and management functions may be any functions for which there is capability in the connected entities. Some sample functions that may be controlled are the following: the process and procedures for recognition, operation and succession of the NCE; user configurable options in the network; the rules and processes for interaction among entities in the network; rules and processes for interaction between connected ports in the network; and rules and processes for management access (either by communication format or physical I/O device) to any particular entity on the network. Therefore, in some embodiments, the NCE (here, computer terminal 1022) is the exclusive mechanism for controlling or altering any of the defined set of functions. In some implementations, the NCE may be reached through any of its normal communications mechanisms, although, higher security may be achieved if the NCE must be directly accessed by an operator. The latter case provides enhanced security because physical access to the NCE may be controlled, such as by use of a secure locked room or enclosure, represented in FIG. 10 by enclosure 1027. In either case, the NCE must communicate with all other entities on the secure portion of the network in order to convey all the necessary configuration and security information. This communication can occur at any time but usually occurs during network initialization or when new entities join the network, or often upon changes to any of the defined set of functions.

Having now discussed the concepts of some single NCE embodiments, FIG. 11*b* shows the logical hierarchy of such a system. Referring then to FIG. 11*b*, which shows authority hierarchy, the NCE would have the highest level of authority and all other entities in the system would have the Lower authority level. Other embodiments of the invention will have multiple levels of authority, as illustrated in FIG. 11*c*, which depicts a 3-level hierarchy. While one or more entities may be in each level of authority, many embodiments of the current invention call for only one entity at the highest level at any one time.

Some specific uses of a 3-level hierarchy, are the embodiments of the invention using an NCE and one or more back-up NCEs to ensure that the unavailability of the NCE does not cause a break down in network security or other disruption on the network. For example, referring again to FIG. 10, terminal 1022 may be the primary NCE and switches 1001 and 1006 may be back-up NCEs. In that case, if terminal 1022 were to go off-line or fail to function, one of the back-up NCE's would become primary and assume all NCE duties. The decision regarding which back-up to use may be made in a variety of ways such as: order of serial numbers or other unique numbers; physical position; logical loading; or capabilities. For our example, suppose we used the entities unique ID number and switch 1001 became primary NCE upon the failure of terminal 1022. If switch 1001 were then to fail, the next NCE back-up (in this case, switch 1006) would become primary NCE. If, in turn, switch 1006 were to fail, then there would be no entity eligible to be NCE. This problem may be handled in at least three ways. If security is paramount, then the problem should be resolved by stopping the substantive communications in the system until an NCE comes on-line. If up-time is paramount, then the system should simply chose any entity to serve as NCE based upon abilities. Finally, the problem may also be resolved by allowing the system to continue operation without an NCE. As a variant of the third solution, some embodiments allow continued operation if the last NCE goes offline, however, no management changes are permitted until an NCE comes back online.

Regarding NCE back-ups, the invention may be implemented where any entity may serve as an NCE back-up or where the NCE back-ups must be pre-designated. Pre-designation of back-up NCEs allows consideration of how appropriate any particular entity may be to physical security or access to the entities. As mentioned earlier, it may be desirable to limit physical access to the NCE.

Returning now to the discussion regarding why back-up NCE systems may be examples of 3-level hierarchy, FIG. 11c may be applied as follows. The primary NCE will have the highest level of authority. The back-up NCE's will have the middle level of authority because they are, at a minimum, more authorized than the other entities in that they are eligible to become the primary NCE. All other entities in the system will posses the lower authority level. The invention contemplates authority schemes with many levels, which would be applied in a similar fashion.

B. Physical Access to Management Functions: The Fabric

Many embodiments of the invention may be implemented in a Fabric (discussed earlier). As discussed in the background, in a Fibre Channel environment the basic elements are generically called switches. Each switch may have one or more ports and each intelligent entity connected to the Fabric will connect through a port. While the following description specifically discusses the interaction between two E-ports in Fibre Channel switches, it may equally apply to any port-bearing entities in switching systems or other communication systems.

Figure 12:
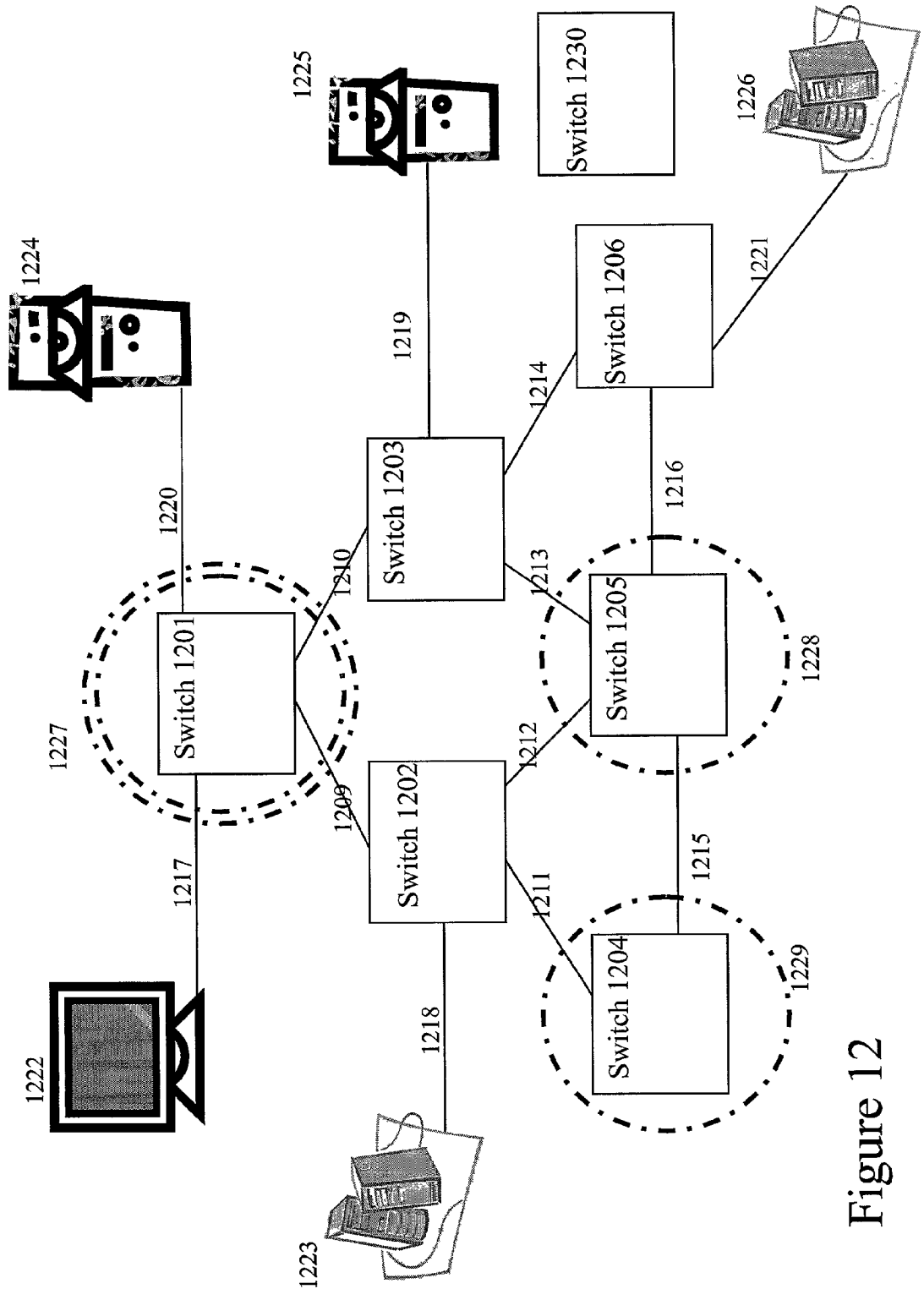
FIG. 12 shows a Fibre Channel fabric and attached devices.

Referring now to FIG. 12, there is shown a Fibre Channel fabric comprising switches 1201, 1202, 1203, 1204, 1205 and 1206 that are coupled by links 1209, 1210, 1211, 1212, 1213, 1214, 1215 and 1216. The fabric couples with various computing and other intelligent systems 1222, 1223, 1224, 1225 and 1226 through links 1217, 1218, 1220, 1219 and 1221 respectively.

Switches 1201, 1204 and 1205 are Fabric Configuration Servers ("FCSs"), which are trusted switches in the network and are identified as such by their world-wide-names ("WWNs"). There is a list of FCSs that is distributed fabric-wide, and may in some embodiments be distributed network-wide (assuming that there may be a connected network outside of the fabric). In some embodiments, the first switch listed on the list is the primary FCS. For purposes of this discussion, assume switch 1201 is the primary FCS, that being the actual switch with exclusive authority for selected management and security functions. In some embodiments those selected functions are: performing fabric-wide management requests; initiating password changes; and initiating SNMP community string changes. In certain embodiments, if the first switch is unavailable then the second switch on the list will become the primary FCS (assume for this example, switch 1204). If the second FCS (switch 1204) is not available, then the third becomes primary (assume switch 1205) and so on.

Referring again to FIG. 12, there may be a desire to add entities such as switch 1206 to the network, or in this particular case, to the fabric. In order to logically join the fabric, the new switch 1206 must be enabled and set to function in the secure mode like the other switches in the fabric. This precedent condition may be fulfilled by (i) operator pre-configuring the switch 1230 entirely, or (ii) by attempting to set or configure the switch through the network once it is physically connected, or (iii) by some combination of operator pre-configuration and through-network configuration. Certain embodiments using this combined approach call for the operator to assure that the switch 1206 is electrically capable and set to secure mode, while the particular management and security information about the fabric come to the new switch 1206 through the network.

In some embodiments, after physical connection to the fabric, perhaps by a connection 1216 with switch 1205, the newly connected switch 1206 receives management and configuration information (e.g. policy sets) from the primary FCS. This information may include any or all of the following: LUN Zoning or other resource zoning settings and information; community security information; login name information; password information; and community management protocol information such as SNMP information. For optimum security, each entity in the network must have security-related information that is consistent with each other entity and in some embodiments, it must be identical. Therefore, any changes in the information, such as those that will occur upon adding switch 1206, must be propagated to the entire secure network (in this case the whole fabric). That may be accomplished by downloading the information from the primary FCS after physical connection. Any entity, including the newly added switch that does not have consistent information becomes segmented, i.e. logically disconnected from the original fabric.

(1) Physical Access to Management Functions: The Fabric; a policy implementation The following description illustrates many features and techniques that may be used in any of the various embodiments of the invention.

The security policy sets (discussed earlier) may include a Fabric Configuration Server ("FCS") policy. This policy defines a list of one or more switches (by WWN) that are designated to be fabric configuration servers. The first switch on the list is designated as the primary FCS, and may be followed by one or more backup FCSs. In operation, if the primary FCS is not a member of the fabric, the first backup FCS will become the primary FCS. If the first backup is not a member of the fabric, then the second will be primary and so on. When the operator attempts to activate the security policy sets, if none of the specified FCS switches are then members of the fabric, the operator is warned and given an opportunity to cancel the activation.

The primary FCS is a trusted switch from which management operation may be performed. Certain classes of inter-switch management traffic (examples below) will not be accepted by other switches in the fabric unless the originator is the designated primary FCS. The primary FCS will also be responsible for distributing the policy sets to other members of the fabric when the fabric first forms and anytime there is an alteration to a policy. In addition, the primary FCS may supply the policies to new switches or potentially other devices entering the network. In some embodiments, the distributed policies comprise a zoning policy set and/or security policy sets and/or passwords.

When connecting a switch to a fabric in which the secure policy sets are already active, the new switch must be set to secure mode with an FCS list that is identical to that of the existing fabric. Similarly, in joining a first fabric to a second fabric that operates in secure mode, the first fabric must be set to secure mode and have an identical FCS list.

In many embodiments, the FCS policy may not be empty. If an attempt is made to run an included security function without the necessary FCS policy set, the function will fail. In addition, in many embodiments, the FCS policy set may not be deleted.

When activated, the FCS policy may have effects on several fabric management operations. The next several paragraphs explain the operational differences.

Zone Configuration. All zoning operations must be performed from the primary FCS. Any attempt to perform zoning operations on other switches will fail. If zoning changes are somehow made on a non-FCS switch, the inter-switch updates will be rejected by other switches in the fabric and the compromised switch will be segmented (logically disconnected from the fabric).

Zone Merge Operations. In secure mode, zones may not merge in the traditional sense. Therefore, when E-ports become active between two switches, only the names of the FCS servers (and a policy set version identifier) are exchanged between the switches. If there is no conflict (i.e. the views are the same), the switches will be added to the network and any remaining policy sets will be downloaded from the primary FCS.

Fabric Segmentation With An FCS in Each Resultant Fabric. If the fabric segments in such a way that one or more FCSs are separated from the others, the resultant fabrics continue to operate us the now-smaller number of FSCs. This is because the policies in each of the fabrics are not changed in that they still contain all the specified FCS switches. Since the fabrics both contain a FCSs and consequently a primary FCS, the operator may perform fabric level administration on one fabric independent of the other. If this is done, the fabrics may not be merged again without restoring identity.

Fabric Formation With no FCS. If segmentation results in a fabric forming without an FCS or if the only FCS switch in a fabric goes offline, the fabric continues to operate with all policies in effect, including the FCS policy. However, in this event, no fabric level management may occur, including zoning, security policy changes, password changes and any API-based switch configuration operations. Furthermore, since no changes may be made, no new switches may be added to the fabric. In the case of segmentation, if the fabric rejoins with another fragment that includes one or more of the FCSs, then operation returns to normal. If all FCSs are permanently gone, then the SecModeEnable command may be used to overwrite the FCS server list. This command accepts as arguments a list of switch WWNs to be used as the new FCS policy.

Taking the Primary FCS Offline. If the primary FCS is taken offline, the fabric continues operation with the first backup taking over as the primary. If a configuration change is made to the fabric while the switch is offline, the version number of the policy set will change. If the original primary FCS then attempts to rejoin the fabric, the operation will fail because of the version stamp. The invention allows the operator to zero the version stamp, which will allow the switch to rejoin the fabric and download the current primary's database. The former primary may then resume it's place as primary.

API Operations. In secure mode, API connections to non-FCS switches are read-only connections allowing discovery operations only. None of the switches in the fabric will accept an API related inter-switch "write" request from any switch other than the primary FCS.

Management Server Operations. In some embodiments, FCS policies will not restrict the Platform Registration functions, even though those functions do, in practice, alter fabric configuration information. These functions are used to allow connected entities to register their identities with the fabric and inherently require accessibility from all endpoints. Some embodiments of the invention call for secure authentication when performing the Platform Registration functions.

SES Operations: If an FCS policy is in effect, SES requests are only accepted from FCSs. SES requests may be forwarded through other switches but are only acceptable if originating from an FCS.

SNMP Operations. If SNMP community strings are enabled in the fabric, the string for read access be set to the same value on all switches in the fabric. The string for write access will also be set to the same value on all switches in the fabric. The values used and any changes must originate with the primary FCS, and, to the extent appropriate are propagated from there. Any attempt to change an SNMP community string on a non-FCS switch will fail. Since SNMP is a switch-by-switch management tool and has no fabric wide effects, FCS has no impact on non-community string SNMP operation. However, some embodiments of the invention restrict the use of SNMP access, in particular, through MAC zones, which are discussed later.

Login Name & Password Changes. If login names are enabled in the fabric, all non-FCS switches share a common login name and password database. The FCS switches also share a common login name and password database that is different than the non-FCS version. The non-FCS switch login database has the root and factory accounts disabled and will have a different admin account password than the FCS switches. The user account will be the same on all switches. The non-FCS switch admin password is set when the fabric is initially set to secure mode. Both the FCS and non-FCS password can be changed using different management command, however, the password changes (as well as login name database changes) require appropriate authority and must originate from the primary FCS. All password changes are distributed to the FCS switches and all non-FCS changes are distributed to all switches. The login databases are also distributed to the appropriate switches by the primary FCS and in most embodiments, upon initialization. Finally, specific switch passwords may be temporarily changed using a management command. This may be necessary for debugging purposes. The switch password will revert to the fabric view upon its next re-boot.

V. Security Over Logical Management Channels

As discussed earlier, this aspect deals with the confidentiality of information during transport. In that respect certain embodiments of the invention call for one or both of the following (i) encryption and secreting techniques during transmission, and (ii) physical detection of link anomalies.

Regarding encryption, while both public-key encryption and secret-key encryption are commonly used today, any encryption may be suitable for a particular application. For example, in many instances secret-key encryption may be sufficient. Nevertheless, because of the computational overhead involved with encryption operations, various embodiments of the invention call for selectively encrypting information based upon the risk it presents if miss-directed. In that regard, many embodiments of the invention call for only the encryption of passwords while other embodiments call for encryption of all management and configuration traffic. In either case, most embodiments of the invention prohibit encryption of routine data transmission due to the overhead.

Regarding physical detection of link anomalies, certain embodiments of the invention call for the monitoring and detection of the communication lines. In these embodiments the lines are monitored for any of the following: (i) events that may indicate the line was temporarily broken; (ii) events that indicate a permanent or temporary energy loss in the line, which may be indicative of tapping; (iii) events indicating a change in frequency, intensity, wavelength or phase of the transmitted signal that may be indicative of tapping or breaking. In these embodiments, once the anomalous event is detected, the system may re-authenticate one or more potentially tainted links.

VI. Logical Access to Management Channels

Many embodiments of the invention use management access controls ("MAC") to place fabric-wide limits on the ability access fabric switches via the various management access methods (e.g. SNMP, HTTP, API etc.) Most embodiments call for one MAC policy per access method. Generally, if a given access method does not have a MAC policy, then there are no restrictions associated with that method. In addition, if a MAC policy exists for a certain access method, but the policy is empty, then that access method is disabled fabric-wide.

MAC policies are a complement to FCS and the two may work well together. For example if MAC policies and FCS policies are simultaneously enforced, the allowed management access methods will only operate on the primary FCS. Alternatively stated, in order to effect any particular management access or activity, that access or activity must be allowed by both the MAC policies and the FCS policy.

The following paragraphs describe implementation details of the MAC policies for the eight management access methods that apply to current FC switches. Each policy may have application in one or more embodiments of the invention.

SNMP MAC Policies. There are two MAC policies for SNMP. Specifically, there is one policy for read access and a separate policy for read-write access. These policies list the TCP/IP addresses from which connections or messages will be accepted by any switch in the fabric. The IP addresses are specified using standard "dot" notation, for example 128.192.74.102. Wild cards are allowed in the IP addresses and a zero field is treated as such.

Telnet MAC Policy. The Telnet policy contains a list of TCP/IP addresses allowed to establish Telnet connections to switches in the fabric. The notation for TCP/IP addresses is the same as for SNMP, illustrated above.

HTTP (WebTools) MAC Policy. HTTP policy contains a list of TCP/IP addresses allowed to establish HTTP connections to switches in the fabric. The notation for TCP/IP addresses is the same as for SNMP, illustrated above.

API MAC Policy: API Policy contains a list of TCP/IP addresses allowed to establish an API connection to switches in the fabric. API connections may be made to any switch in the fabric, but only those connections to FCS servers can be used for write operations. The notation for TCP/IP addresses is the same as for SNMP, illustrated above.

SES MAC Policy. The SES policy contains a list of WWNs of device ports that are allowed to access SES.

Management Sever MAC Policy. This policy contains a list of WWNs of device ports that are allowed to access Management Server functionality.

Serial Port MAC Policy. The serial port policy contains a list of switch WWNs for which serial port access is enabled. If a serial port MAC policy exists, then all switches not in the policy member list have their serial ports disabled. If the MAC policy exists and is empty, then all serial ports are disabled.

Front Panel MAC Policy. This policy contains a list of switch WWNs for which front panel access in enabled. If a front panel MAC policy exists, all switches not in the policy member list have their front panels disabled. If a MAC policy exists and is empty, then all front panels are disabled.

VII. Device or Entity Connection Controls.

A. Device or Entity Connection Controls: Applying Policies

In specific implementation, the invention has provided two differing policies for device and entity connection controls. The first is the "DCC" policy, or device connection control policy. In some embodiments, this policy allows for the specification of the rules for binding non-switch ports to switch ports and multiple DCC policies may exist in the fabric. For example, referring to FIG. 12, switch 1203 has only one port connected to a non-switch entity, which is computer 1225. In order for link 1219 to transmit data and information, the DCC policy must bind the switch port connected to link 219 with the host bus adaptor port in computer 1225. If that binding is not in the DCC policy, then the link will be ineffective.

For further illustration, if the table below represents the DCC policy, then Non-Switch WWN1 (port X) may only connect with Switch Ports WWN1 and WWN3. If Non-Switch Port WWN1 (port X) attempts to connect with Switch Port WWN2, the switch will reject (logically disconnect) the non-switch port. Similarly, according to the table, Non-Switch Port WWN2 (port Y) may only link with Switch Ports WWN1, WWN2 and WWN4.

| Non-Switch Port Identity | Bound to Switch Ports Identified As |
| --- | --- |
| Non-Switch WWN1 (port X) | Switch Port WWN1 |
|  | Switch Port WWN3 |
| Non-Switch Port WWN2 (port Y) | Switch Port WWN1 |
|  | Switch Port WWN2 |
|  | Switch Port WWN4 |

When a DCC policy is active, whenever a non-switch device performs a FLOGI request, the WWN specified in the FLOGI request will be validated to ensure that the device is connected to an authorized switch port. If the validation fails, then the non-switch device is denied access to the fabric through that port. WWNs that are not specified in a DCC policy will be allowed to connect to any switch port that is not mentioned in a DCC policy. In some embodiments of the invention, all PLOGI's to devices are intercepted and a verification is done to insure that the source port isn't attempting to spoof the target device with a WWN other than that used for the corresponding FLOGI.

A DCC member list contains one or more non-switch device port names and one or more switch port references. The non-switch device port references are by port WWN, while the switch port reference are by switch WWN followed by a parenthetical port list.

The second policy for device and entity connection controls is the switch connection control policy ("SCC"). This policy contains a list of switches (by WWN) that are allowed to be a member of the fabric. Switches not in the list will not be allowed to join the fabric. If the SCC policy does not exist, then no limitations are put on which switches may join the fabric. Each individual port in the fabric enforces the policy at the E-port level. Each switch examines each E-port connection to determine if the connected switch is named in the SCC policy. If tnot in the list, the E-port is segmented. During initial fabric build, a switch not in the SCC list will be allowed to join the fabric for a short time while that switch's neighbors await download from the primary FCS.

Finally, the invention allows for combining the SCC policy with the DCC policy to yield similar functionality. The combination policy has the same form as the DCC policy, yet the difference is in implementation. As shown in the table below, the combined policy specifies all ports in the system (switch and non-switch) and, for each, all allowed connections. In this manner, the DCC function is satisfied by listing all ports to which non-switch ports can link. Furthermore the SCC function is also satisfied because all ports are listed; therefore, if a port attempts to enter the fabric but is not a member of the list, then it is segmented.

| Port Identification | Allowed Connections |
| --- | --- |
| Switch Port WWN5 | Non-Switch Port WWN7 |
|  | Non-Switch Port WWN9 |
|  | Switch Port WWN4 |
| Non-Switch Port WWN9 | Switch Port WWN7 |
|  | Non-Switch Port WWN7 |
|  | Switch Port WWN6 |

VIII. Link Authentication

A. Generally

As discussed earlier, a fundamental element of security is the ability to be exactly sure of who or what is at the other side of a communication connection. If one desires a secure system, each element in the system must be certain of the authentic identity of all connected elements. For example, referring then to FIG. 1, switch 116 must be mutually authenticated with switches 110 and 114 as well as elements 132, 134, 168, 166, and 164. Furthermore, examining at a more granular level, a switch (an element), may authenticate another switch (another element) one port at a time. Therefore, the authentication process may begin at the port (or sub-element) level.

Figure 3:
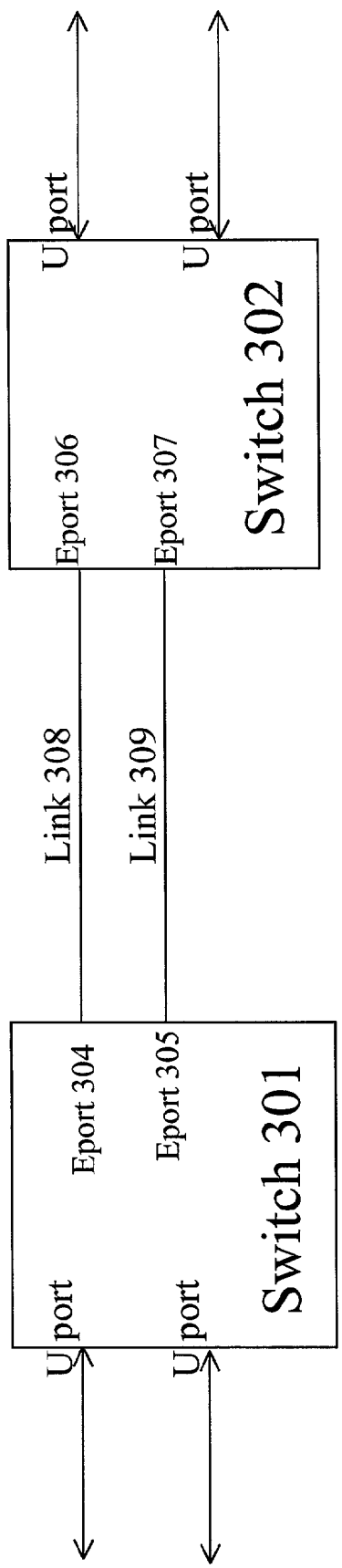
FIG. 3 is a two switch or entity fabric.

Referring to FIG. 3, a fabric is shown including two switches 301 and 302. The switches are linked together twice (sometimes called "trunking") by links 308 and 309. Link 308 joins E-port 304 with E-port 306 and link 309 joins E-port 305 with E-port 307. Of course, in the broadest context, the links may consist of any viable communication transport mechanism, such as copper or metal wires, fibre or other light carrying mechanism or even an RF-carrier system.

In one embodiment of the invention, the switches 301 and 302 become mutually authenticated one link at a time. More specifically, in those embodiments, a single link between two switches (for example, link 308) will begin and end authentication before the next link begins. For example link 308 may authenticate first via a communication exchange between E-port 304 and E-port 306. After the authentication of link 308 is ended, then link 309 would authenticate via a communication exchange between E-port 307 and E-port 305. In other embodiments, the links 308 and 309 may authenticate simultaneously or one link may begin authentication before the other completes.

Figure 4:
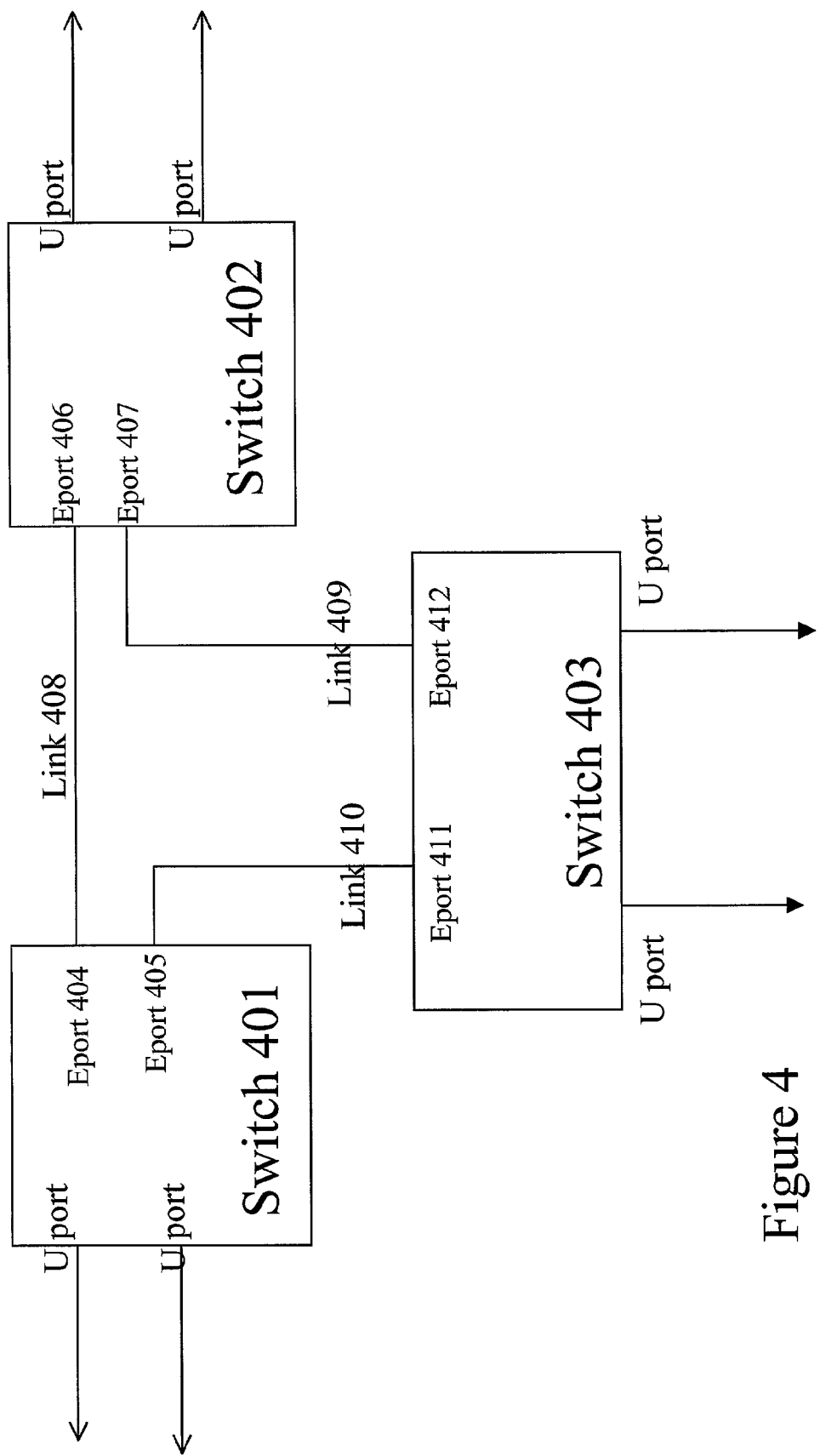
FIG. 4 is a fabric including 3 switches.

Referring now to FIG. 4, a fabric including 3 switches is shown. To fully authenticate the fabric, each switch must mutually authenticate with the other two. This may occur as follows: switch 401 may authenticate with switches 403 and 402 by respectively authenticating link 410 (ports 405 and 411) and link 408 (ports 404 and 406); switch 403 may mutually authenticate with switch 402 by authenticating link 409 (ports 412 and 407). In some embodiments, the authentication will occur one switch at a time. Specifically, one switch will fully authenticate itself with all switches (to which it connects) before the next switch begins. For example, in fully authenticating the fabric of FIG. 4, switch 401 may begin and end authentication with switch 403 and then begin and end authentication with switch 402, after which switch 402 would begin authenticating itself with switch 403.

B. Basic One Link Authentication

In certain embodiments, the invention contemplates that system elements may authenticate each other by authenticating all communication links between all relevant ports (or connection points). In such a system, a first element must authenticate all ports to which it connects ("connected ports"). Furthermore, in order to achieve mutual authentications, the connected ports must authenticate the first port.

Figure 5A:
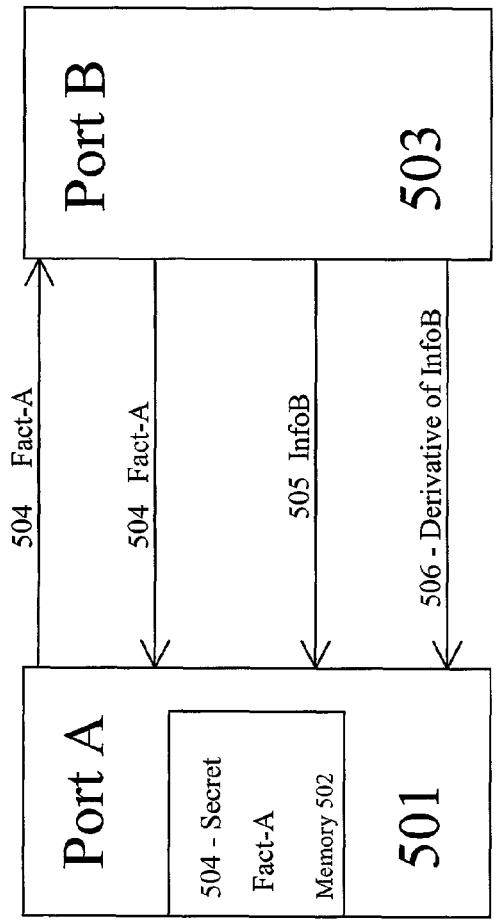
FIG. 5a shows a basic approach for a one way authentication.

Referring to FIG. 5a, there is shown a very basic approach for a one way authentication along with (i) port A 501, (ii) memory associated with port A 502, (iii) Secret Fact-A 504, (iv) port B 503, (v) InfoB 505, and (vi) derivative of InfoB 506. The figure demonstrates port A 501 authenticating port B 503 and for easier reading, some of the numbers may be withheld in the following description. In this implementation, Port A 501 must generate or otherwise obtain a secret fact and remember that secret fact in some way such as by storing it in a memory like memory 502. Port A sends to port B the Secret Fact-A. Port B receives Fact-A and sends back the following: Fact-A; Information about port B ("InfoB"); and a derivative of InfoB. In this very basic case, InfoB may include any information about or related to port B and the derivative of InfoB can be anything based upon InfoB, such as a encryption, encoding, checksum or hash or even an encryption or encoding of a checksum or hash. When port A receives the information, it does the following verifications to achieve one-way authentication. Port A validates that the Fact-A received is the same as the Fact-A sent. If it is, there is a higher probability that the information came from port B. This is because Port A only sent the information to port B. Port A also attempts to verify InfoB 505 with the derivative of InfoB 506. This may be accomplished by either, (i) creating a derivative (the same way B did) of InfoB 505 and comparing the created derivative to the sent derivative 506, or (ii) reversing the derivative of InfoB 506 to attempt to re-create InfoB and then comparing the re-created InfoB with the received InfoB 505. Whichever technique is used, if the compare shows identity, then the probability of B's authenticity is further increased. This increased probability is shown in various ways including the following: first, InfoB is information about B which validates, to some extent, that B is the source; second, in order to have an identical match, Port A must have used an deriving or re-creating mechanism that is identical or complementary to the mechanism that port B used. At the end of this process, port A has authenticated port B. In order for port B to authenticate port A, the ports must change roles in the same process. After doing so, ports A and B would then be mutually authenticated.

Figure 5B:
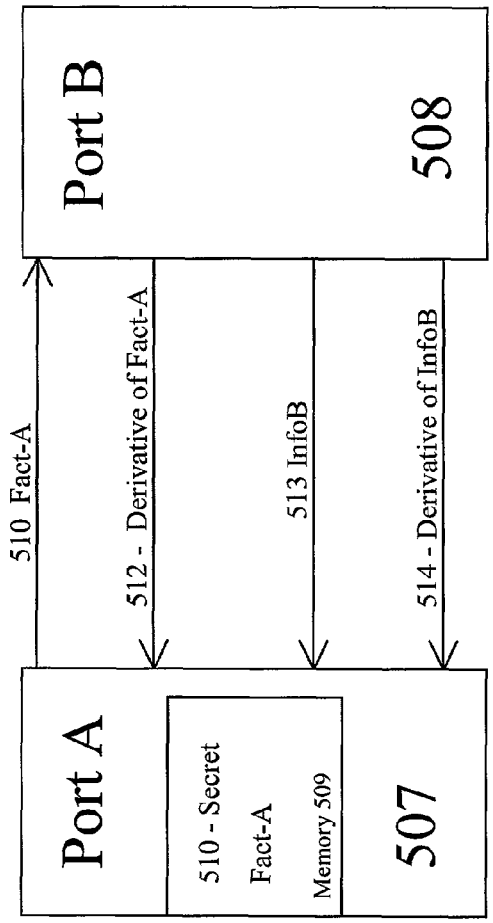
FIG. 5b shows an approach for authentication.

This very basic implementation may be enhanced in a multiplicity of ways. Referring to FIG. 5b, a similar process is shown, this time including (i) port A 507, (ii) memory associated with port A 509, (iii) Secret Fact-A 510, (iv) port B 508, (v) derivative of Fact-A 512, (vi) InfoB 513, and (vii) derivative of InfoB 514. Once again, for easier reading, some of the numbers will be withheld in the following description. Differing here is the use of a derivative of Fact-A 512 rather than simply Fact-A 510 in a transfer from port B to port A. Applying a similar process as in the first example, this change would cause port A to compare its memorized Fact-A 510 with the received derivative of Fact-A 512 in a manner similar to the way that the InfoB information was handled in the earlier example. That is, Port A can make the compare by either, (i) creating a derivative (the same way B did) of the stored Fact-A 510 and comparing the created derivative to the sent derivative 512, or (ii) reversing the sent derivative of Fact-A 512 to attempt to re-create Fact-A and then comparing the re-created Fact A with the stored Fact-A 510. Like the case with InfoB this adds to the confidence of authenticity because of the necessity that Port A's derivation or re-creation methods must be identical or complementary to those used by Port B. Of course, the confidence would be further enhanced if the derivation methods were specific to port A, port B or something related to one or both. For example, the derivation scheme may be one that is specific to a group of ports in which both Port A and Port B are members. The derivation scheme might also be specific to one port or the system upon which one port is resident.

Referring now to FIG. 5c, there is shown (i) port A 515, (ii) memory associated with port A 516, (iii) Secret Fact-A 517, (iv) port B 518, (v) type 1 derivative of Fact-A 519, (vi) InfoB 520, and (vii) type 2 derivative of InfoB 521. Once again, for easier reading, some of the numbers may be withheld in the following description Expanding now on the concept of derivative types that are specific to ports, assume a derivation scheme (e.g. Scheme Alpha) is specific to an entity (e.g. Entity Beta). It follows that the Beta entity may create derivations of facts using the Alpha scheme (e.g. BDA—Beta's Derivative using scheme Alpha). Since Alpha type derivations are specific to Entity Beta, anytime a different entity identifies an Alpha type derivation, there is a high degree of confidence that the source was entity Beta. Referring now to FIG. 5c, this concept is useful in authenticating ports. Port A will send a secret fact 517 to port B and then receive back a type 1 derivative of that fact 519. If the type 1 derivative is specific to port B, then port A can have a very high degree of confidence that the secret fact 517 actually arrived at port B and that the response 519 is actually from port B.

Referring now more broadly to FIG. 5c, the probability of true authentication is further enhanced because derivative of Fact-A 519 and derivative of InfoB 521 are created through differing derivation schemes (type 1 and type 2 respectively). Furthermore, as above, this technique may be varied by using derivation schemes that are specific to one or both ports. For example, type 1 derivation may be specific to port B while type 2 derivation may be specific to a system or group of port in which both port A and port B are members.

Many of the aforementioned concepts are illustrated now in FIG. 5d, which shows a mutual authentication process between port A and Port B and includes the following: (i) port A 522 and port B 524, (ii) memory associated with port A 535 and memory associated with port B 525 (iii) Secret Fact-A 523 and Secret Fact B 526, (iv) type 1 derivative of Fact-A 528, (v) type 2 derivative of Fact-B 530 (vi) InfoA 531, (vii) type 3 derivative of InfoA 532; (viii) InfoB 533, and (ix) type 4 derivative of InfoB 534. Once again, for easier reading, some of the numbers may be withheld in the following description. Here, the exchange for mutual authentication goes as follows. Port A may authenticate port B after receiving (i) InfoB 533, (ii) a type 1 derivative of Fact-A 528, and (iii) a type 4 derivative of InfoB 534. Port B may authenticate port A after receiving (i) InfoA 531, (ii) a type 2 derivative of Fact-B 530, and (iii) a type 3 derivation of InfoA 532. Noteworthy here is that there are four types of derivation. This may be used to lend tremendous credibility to the authentication process, particularly if the derivation schemes are one-way and complementary as in a public key infrastructure system. In an embodiment of that nature (using a PKI infrastructure), if a type 1 derivation is specific to port A (or its host system), then once port B created its derivation of Fact-A, only port A can recreate Fact-A for comparison (of course, in a PKI system, port A would actually recreate a hash, but that will be explained in greater detail later).

In another embodiment, type 1 derivation would be specific to port B, type 2 derivation would be specific to port A and type 3 and 4 derivations ("type 3-4") would be the same and specific to a system in which ports A and B are members. An embodiment of this nature is ideal for mutual authentication of ports. This is because three types of derivation (e.g. encryption, encoding or other schemes to enhance security), allows each port to authenticate the other in two ways:

One way by using a derivative type specific to the port to be authenticated. Therefore, if port A is authenticating port B, the type 1 derivation will be used and when port A verifies its secret fact, it will have a high degree of certainty that the derived secret fact came from port B because type 1 derivatives are specific to port B; and, A second way by using a derivative type specific to a larger grouping. For example all authorized entities may share the type 3-4 derivative. Therefore, in receiving InfoB (which is generally information about port B), if Port A recognized a type 3-4 derivative, then port A will have a high confidence that port B is from the authorized group C. Efficient Mutual Authentication In any communication system and especially in switching and networking systems, the efficiency of communication is important. There is generally little exception for overhead items such as security. Therefore, while the basic mechanisms for mutual authentication have been described, they may be enhanced by a sequencing and process that accomplish the authentication most efficiently. The sequencing and process for mutual authentication, for some embodiments of the invention, is shown in the table on FIG. 6. Referring then to FIG. 6 in conjunction with FIG. 5d, an entire efficient mutual authentication may be described. Since type 3 and type 4 derivations are the same for this embodiment, the terms "type 3," "type 4" and "type 3-4" all mean the same here. In step 1, port A will request authentication by sending an instruction indicating Authentication Request to port B along with accompanying information (a payload). In this embodiment, the payload accompanying the Authentication request is Secret Fact-A 523. Next, in step 2, port B sends a Acknowledgement of the Request to port A. The Acknowledgement instruction is accompanied by a payload that includes (i) Secret Fact-B 526, (ii) a type 1 derivative of Secret Fact-A 528 (where type 1 derivatives are specific to port B), (iii) InfoB 533 (typically, information about port B), and (iv) a type 3-4 derivative of InfoB 534 (where a type 3-4 derivative is specific to a group or ports or switches in which ports A and B are members). At this point, port A has sufficient information to confirm or deny the authenticity of port B. Assuming that port B was authenticated, next, in step 3, Port A sends a Confirm Authentication instruction to Port B. That instruction is accompanied by the payload (i) a type 2 derivative of Secret Fact-B 530 (where a type 2 derivative is specific to port A), (ii) InfoA 531, and (iii) a type 3-4 derivative of InfoA 532. Given that information, port B can now deny or confirm authenticity of port A. In this embodiment, the entire mutual authentication process required only three steps. Of course, functionality, such as a "Complete" signal could be added at the expense of additional steps. Referring now to FIG. 7, the chart shown demonstrates an alternative process for completing mutual authentication in three steps.

Referring now to FIG. 8, a two-step mutual authentication process is shown. By comparison to the example for FIG. 6, FIG. 8 omits step 1, which is the authentication request accompanied by the payload of Secret Fact-A. The invention contemplates that this step may be removed when the system generally interprets any communication from an unknown entity as a Request to Authenticate. The receiving port would then need to complete authentication before doing either of the following (i) propagating anything sent by the sending port beyond the control of the receiving port, or (ii) allowing the sending port access to anything secure in the system. Furthermore, in order to complete the mutual authentication, the receiving port will need to find a substitute for Secret Fact-A. For this substitute, the port could choose amongst the following: all instructions received from the sending port; all payloads received from the sending port; any identity information received from the sending port (identity information might include any information related to the port, including without limitation, information about the port itself, its host system or any grouping or relationships in which the port is involved); any identity information known or inferable by the receiving port; or any combination of the foregoing. For example, the Fact-A substitute may comprise a combination of received data, received identity information and inferred identity information. Continuing on with FIG. 8, the mutual authentication goes forward as shown. Of course, Secret Fact-B may be substituted like Fact-A or not.

D. Authentication Specific to a Fabric

Many embodiments of the invention may be implemented in a Fabric (discussed earlier). As discussed in the background, in a Fibre Channel environment the basic elements are generically called switches. Each switch may have one or more ports and each intelligent entity connected to the Fabric will connect through a port. While the following descriptions specifically discuss the interaction between two E-ports in Fibre Channel switches, it may equally apply to port-bearing entities in switching systems or other communication systems.

While many of the embodiments discussed herein may exploit Public Key Infrastructures ("PKI"), the embodiments discussed in connection with FIG. 9, sometimes make specific reference to PKI elements and processes. Once skilled in the art would be familiar with PKI and likely need no predicate, however, some basic predicate is nevertheless provided.

Many embodiments of the invention contemplate that each intelligent entity in the network (here we will say a switch) has its own PKI infrastructure, which comprises a certificate, a CA root certificate, a public key and a private key.

A certificate or digital ID is generally the electronic equivalent to a driver's license of passport. It is used for electronic presentation to verify identity. The certificate binds the identity to a pair of electronic keys, one public and one private. The certificate specifically comprises: a public key for the switch; a private key for the switch; a version of the switch's own certificate signed with the private key of the root CA; and the Root CA certificate, which includes the public key of the root CA.

A CA root certificate is a certificate authority root certificate, which is essentially the digital certificate of the certification authority, except it does not include the CA private key.

The certification authority is the entity that issues certificates and it sits at the top of the security food-chain, i.e. trust in the CA is assumed. The CA issues certificates signed with its own private key and users verify the CA using the CA root certificate (including the public key). (While this example discusses the Root CA and Root CA certificate, the invention may be generalized to CA and CA certificate. The invention does not require that the CA be at the top of the chain, although, it should be higher in the chain than all the entities that need to mutually authenticate.)

"Signing" something (usually a data structure) involves the following process. Take a hash of the item to be signed and encrypt the hash. Often a signed item is sent with the un-hashed and un-encrypted item. That way a comparison may be made by the receiving entity.

In order to obtain a PKI infrastructure, each switch must access the certificate authority either during manufacturing via installation or later through some other communication mechanism. In the case where the certificate is not obtained during manufacturing, a switch may obtain a certificate using a software utility running on the switch or a connected host. In one embodiment the utility is host-based and it functions by gathering up all the certificate requests in the fabric and potentially elsewhere in the host-connected network. In that embodiment, the utility uses the host infrastructure to first query the certificate authority to satisfy the switches' certificate requests. The certificate authority communicates with the utility and fulfills these requests. The utility then distributes the certificates to the appropriate requesting switches. When a switch ships from the factory, it has a certificate on board so the utility is unnecessary. If a switch is upgraded from a firmware level without security, then it must go through some type of certificate acquisition process. In one embodiment the switch manufacturer serves as the certificate authority and a website is used to facilitate communication with the host-based utility. Furthermore, the physical communication between the host and certificate authority may be any useful communication vehicle such as the Internet, a telephone line, a proprietary network, a wireless link, any combination of the foregoing or any other way that two intelligent machines may communicate).

Figure 9:
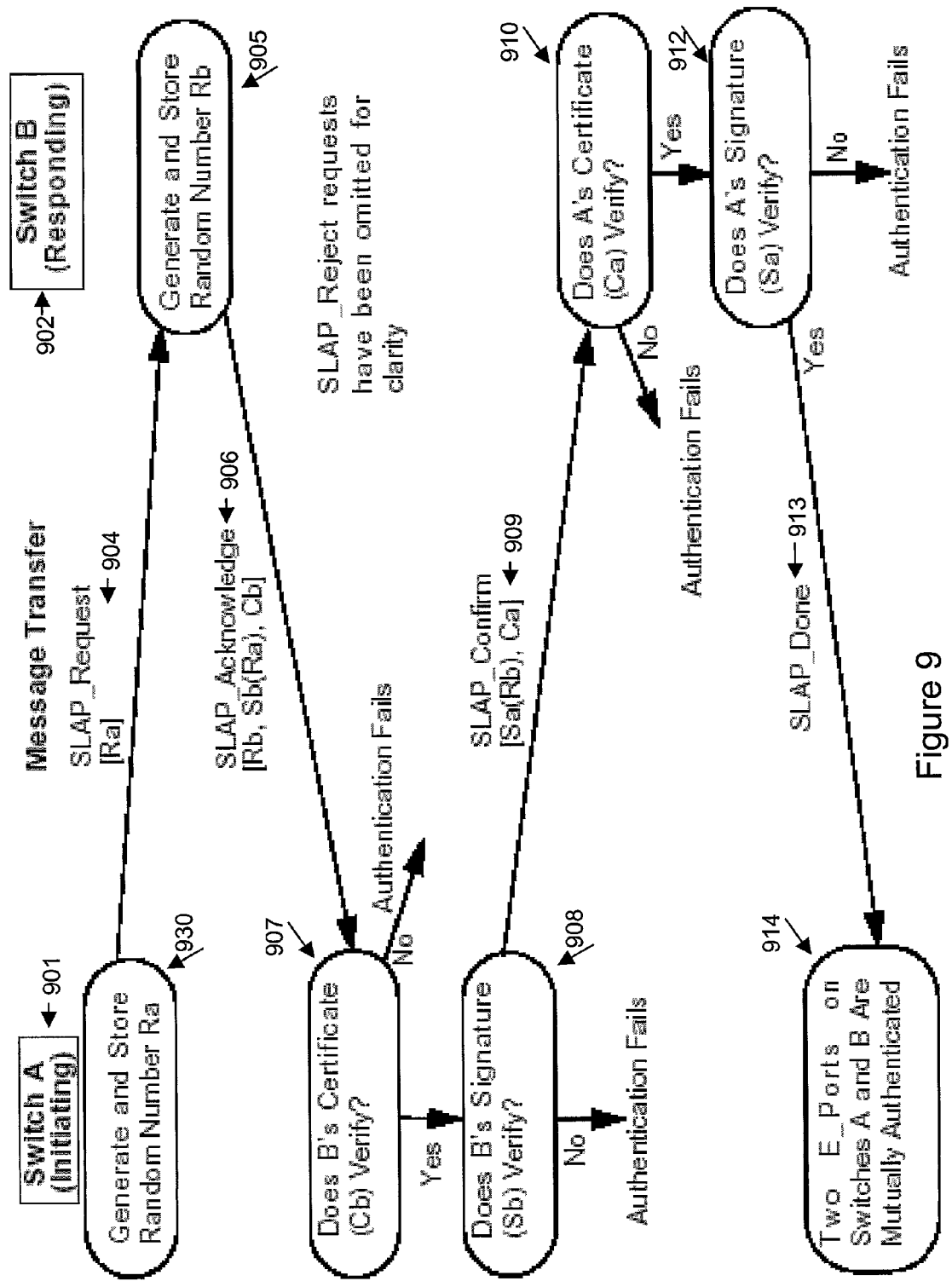
FIG. 9 shows hardware and a process for authenticating two switches.

Referring now to FIG. 9, there is shown hardware and a process for authenticating two switches; Switch A 901, the initiating switch, and Switch B 902, the responding switch. In this embodiment, the process is called SLAP, which is an acronym for Switch Link Authentication Protocol. On the left of FIG. 9, the process steps executed by Switch A 901 are shown. On the right, the process steps executed by Switch B are shown. In the middle, the instructions and payloads are represented.

A system may begin a SLAP at any of the following times: (i) upon power-up of the fabric or any port-bearing entity that may be included in the fabric; (ii) upon entry of a new port into the fabric; or (iii) upon a user command (either a human user of an application somewhere on the network). In some embodiments, the SLAP is initiated by the port with the highest world-wide-name ("WWN"). WWNs are unique numbers used to identify ports in certain networking systems such as in a Fibre Channel network.

Referring to FIG. 9 and assuming that switch A's 901's port has the higher WWN, switch A 901 may initiate a SLAP with Switch B 902. In doing so, switch A 901 will generate a random number. In some embodiments, that random number may be a nonce. A "nonce" is generally a non-repeating string freshly generated by the sender. In some embodiments, the nonce is obtained through a PKI call but it might also be obtained in any known manner, such as by implementing as a counter (a sequence number) or as a timestamp. For purposes of this example, whether a nonce, random number of other fact, the item will be designated as Ra, which generally indicates a random number generated by switch A 901 After generating Ra, switch A 901 stores Ra in a local memory. Any type of memory (DRAM, SRAM, optical, magnetic or otherwise) is sufficient although many embodiments use SRAM local to the engaged port. Switch A 901 then sends a SLAP_Request instruction 904 to switch B 902. The payload with the instruction 904 is "Ra."

Switch B 902 receives the instruction 904, and engages in the SLAP. First switch B 902 stores Ra in memory. Switch B 902 then generates its own fact, "Rb." Switch B 902 then sends to Switch A, a SLAP Acknowledge instruction 906. The payload with SLAP Acknowledge 906 comprises: Rb; a copy of Ra signed with switch B's 902's private key ("Sb(Ra)"); and switch B's 902's certificate.

For illustrative purposes, this paragraph describes Switch B's 902's actions in detail in order to more fully appreciate the interaction with PKI infrastructure. In signing Ra, switch B 902 creates a hash of Ra and then encrypts the hash using switch B's 902's private key. In the case of the switch B's certificate (Cb), it comprises: switch B's public key; switch B's WWN (world-wide name); other information about switch B that is static (capable of being shipped with the switch); and a signed version of the data structure that comprises all of the foregoing three items—that is, a Root CA signed version of the Cb data-structure. Therefore, switch B 902 simply sends the signed version of its certificate that came from the root CA (with switch B's 902's original certificate). Switch B 902 cannot create the signed portion of Cb because it is signed with the PRIVATE key of the Root CA (neither switch B nor any other entity should have access to the Root CA private key).

Referring again to FIG. 9, switch A 901 receives the SLAP Acknowledge instruction 906 and attempts to verify (in no necessary order) both Cb and switch B's 902's signature. If either does not verify, then the SLAP ends and no communication between the ports will be allowed until a SLAP completes successfully. If both the certificate and the signature verify, then switch A 901 sends a SLAP_Confirm instruction 909 to switch B 902. The payload for the SLAP_Confirm instruction 909 comprises a signed version of Rb ("Sa(Rb)") and Ca, which is switch A's 901's certificate.

Once again for illustrative purposes, this paragraph will describe details of switch A's 901's activity prior to sending the SLAP_Confirm 909. Switch A 901 will first attempt to verify Cb (the certificate) sent by switch B 902. To do so, switch A 901 first creates a hash of switch B's 902's certificate. Second, switch A uses its copy of the Root CA public key to decrypt the signed copy of switch B's 902's certificate. Third, switch A compares those two values. If the values are the same, then switch B's 902's certificate is verified. This means that switch A 901 has indeed received a copy of switch B's 902's authentic certificate. We know this because the certificate authority is trusted and a hash of switch B's 902's certificate (as provided by switch B 902) was identical to the hash of switch B's 902's certificate derived by decrypting a version signed by the Root CA. Next switch A 901 will attempt to confirm switch B's signature. To do this, first switch A creates a hash of the previously stored Ra. Second, switch A uses switch B's 902's public key (just received) to decrypt the Sb(Ra). If the results of the first and second steps yield identical hash values, then switch B's 902's signature is verified meaning switch B is what it says it is and that the SLAP_Acknowledge was certainly sent by switch B 902.

Referring back to FIG. 9, switch B 902 receives the SLAP_Confirm instruction 909 and then attempts to perform similar confirm operations. In particular, Switch B 902 attempts to verify Ca and switch A's 901's signature. If either does not verify, then the SLAP terminates and the engaged ports will not be allowed to communicate. If the signature and Ca verify, then the SLAP is functionally complete and the two switches are functionally mutually authenticated. However, in order for switch A 901 to know the operation was successful there must be some indication from switch B 902. Referring to FIG. 9, that indication is the SLAP_Done 913 instruction sent from switch B 902 to switch A 901.

Yet again, for illustrative purposes the details of switch B's 902's activities will be described for the time just prior to sending the SLAP_Done instruction 93. First, switch B 902 will attempt to verify the certificate Ca sent by switch A 901. To do so, switch B 902 first creates a hash of Ca. Second, switch B 902 uses its copy of the Root CA public key to decrypt the signed copy of switch A's 901's certificate. Third, switch B 902 compares those to values. If the values are the same, then Ca is verified. This means that switch B 902 has indeed received a copy of switch A's 901's authentic certificate. We know this because the certificate authority is trusted and a hash of switch A's 901's certificate (as provided by switch A 901) was identical to the hash of switch A's 901's certificate as derived by decrypting a version signed by the Root CA. Next switch B 902 attempts to confirm switch A's 901's signature. To do this, first switch B 902 creates a hash of the previously stored Rb. Second, switch B 902 uses switch A's 901's public key (just received) to decrypt Sa(Rb). If the results of the first and second steps yield identical hash values, then switch A's 901's signature is verified meaning switch A is what it says it is and that the authentication confirm instruction was certainly sent by switch A.

E. Timing Authentication

In some environments, the timing of a mutual authentication process may be security critical or may create opportunities for design excellence. In the area of critical security, in order to be most secure, authentication must be completed prior to the exchange of substantive data or the granting of access to downstream data and services. In the area of design opportunity, the authentication process may be used to resolve potential throttling problems upon system start-up. This throttling problem occurs because the overhead activities associated with start-up are management items that are inherently slow compared to data operations. During start-up of a network, every entity on the network may attempt to perform these management operations simultaneously. The result may be a large amount of management requests coming to an entity from every port. The consequence may be a failure in the system or delays which are disproportionate to the start-up time required if the management functions were handled sequentially or otherwise orderly. While, this problem is most likely to occur in larger networks, FIG. 4 may be used as an example. Referring to FIG. 4, for exemplary purposes, assume that all three switches and all entities connected through the Uports began operating simultaneously (perhaps during a power up). Focusing now on switch 401, management and overhead inquiries associated with both Uports and both Eports might arrive simultaneously. These four simultaneous sets of requests might overwhelm the capabilities of the switch 401. Of course, in a more practical application having several switches and other connected entities, the problem becomes more probable and troubling.

The authentication process may be exploited to resolve this problem. More specifically, the authentication process may dictate that the host entity may only authenticate one link at any given time. By itself, this limitation will add order to the situation when an entity is over-burdened with overhead activities. However, a solution may be further enhanced by strategically placing the authentication process in the sequence of start up. Ideally then, as each link comes up, it will reach the authentication stage and then the process may stop pending completion of any other link authentication occurring on the host entity. The designer may further enhance the solution by prioritizing the authentication task appropriately among the other tasks that run during start up. For example, a lower priority will allow all high priority tasks to run before the link is held waiting for its turn to authenticate. Essentially, the designer selects a threshold priority. Tasks that are vital to fabric formation would then generally have priority above the threshold, and as such, be executed without delay. Other tasks would be prioritized below the threshold and thereby experience potential delays that are ultimately beneficial to the system. While the delays may be caused by any program addition, including pure no-op cycles, a preferred embodiment of the invention calls for use of the authentication function with its one-port-at-a-time rule. Other embodiments might simply force a one-port-at-a-time rule without the use of an authentication function.

In the Fibre Channel switching environment, the invention envisions a more particular implementation of authentication timing and administration in. Specifically, in the case of two Eports mutually authenticating, the SLAP discussed earlier, is sandwiched between ELP and EFP during the start up process (in practice this is a threshold selection). Information about ELP, EFP and much of the context of the invention's placement of SLAP can be found in the FIBRE CHANNEL SWITCH FABRIC-2 (FC-SW-2) specification which can be found in the NCITS working draft of the American National Standard for Information Technology (ANSI), revision 5.3, Jun. 26, 2001 (incorporated herein, by reference, in its entirety).

In brief, ELP and EFP are part of the Switch Fabric Internal Link Services (SW_ILS) that operate in the Fabric between Switches in a Fibre Channel network. In the case of Exchange Link Parameters (ELP), Link Services also operate internal to the Fabric between Bridge devices as well as switches.

The Exchange Link Parameters (ELP) Switch Fabric Internal Link Service requests the exchange of link parameters between two interconnected ports, the operating environment between the two ports, and the capabilities of the switches or bridge devices that are connected by the ports. The Exchange Fabric Parameters Switch Fabric Internal Link Service requests the exchange of fabric parameters between two E_Ports and is used to establish the address allocation within the Fabric.

By placing the SLAP between ELP and EFP, the SLAP may enforce order on the system configuration where Eports are involved (this is because ELP always immediately precedes EFP in configuration between Eports). Order is enforced by implementing rules for the SLAP process that (i) prevent any one switch from engaging in a SLAP for more than a single port at any given time, (ii) placing a low enough priority on SLAP that the switch will service other ports' tasks which are high priority for forming the fabric or otherwise.

F. A Specific SLAP Embodiment

The following notations indicate the details of a fairly specific embodiment of SLAP.

(1) SLAP Format

The SLAP Switch Fabric Internal Link Service transfers a SLAP command and its related information from one switch to another switch. The Switch Link Authentication Protocol (SLAP) request Sequence is as follows:

Format: FT-1

Addressing: For use in a Fabric environment, the S_ID field shall be set to hex'FFFFFD', indicating the Fabric Controller of the originating Switch. The D_ID field shall be set to hex'FFFFFD', indicating the Fabric Controller of the destination Switch.

Payload: The format of the SLAP request Payload is shown in Table 1.

TABLE 1

SLAP_ILS Payload

| Item | Size Bytes |
| --- | --- |
| SLAP_ILS Code: hex '40' | 1 |
| Reserved | 1 |
| SLAP Command Code | 1 |
| Protocol Version | 1 |
| Command Dependent Information | n |

SLAP_ILS Code: This value is set to hex '40' to indicate that this Internal Link Service is a SLAP_ILS.

SLAP Command Code: This field contains an 8-bit unsigned binary integer that specifies the SLAP command that is to be transported from the originating switch to the destination switch. Valid command values are shown in Table 2.

TABLE 2

SLAP Command Codes

| Value (hex) | Description | Direction of Flow |
| --- | --- | --- |
| 00 | Reserved | |
| 01 | SLAP_Request | Initiating_Switch to Responding_Switch |
| 02 | SLAP_Acknowledge | Responding_Switch to Initiating_Switch |
| 03 | SLAP_Confirm | Initiating_Switch to Responding_Switch |
| 04 | SLAP_Done | Responding_Switch to Initiating_Switch |
| 05 | SLAP_Reject | Either Direction |
| Other values | Reserved | |

Protocol Version: This field contains an 8-bit unsigned binary integer that specifies the version of the SLAP protoco. This value shall be set to hex'01'.

Command Dependent Information: Contains information related to the specific SLAP command specified in the SLAP Command Code field.

(2) SLAP Request

The SLAP_Request is sent from the Initiating_Switch to the Responding_Switch to begin the SLAP protocol. The SLAP_Request shall be sent by the Switch with the highest Switch_Name. Hence the Switch with the highest name shall become the Originating_Switch. The format of the SLAP_Request information is shown in Table 3.

TABLE 3

SLAP_Request Information

| Item | Size Bytes |
| --- | --- |
| Transaction Identifier | 4 |
| Initiating_Switch Nonce | x |

Transaction Identifier: This field shall contain the 32 bit unsigned integer Transaction Identifier generated by the Initiating_Switch.

Initiating_Switch Nonce: This field shall contain a nonce created by the Initiating_Switch. The format of the nonce follows the general format described in (3) General Nonce Format The general nonce format is described in Table 4.

TABLE 4

| General Nonce Format | |
|---|---|
| Item | Size Bytes |
| Format Identifier | 2 |
| Nonce Length | 2 |
| Nonce Value | n |

Format Identifier: This field identifies the format of the nonce. Valid Format Identifiers are described in Table 5.

Nonce Length: This field indicates the total length in bytes of the Nonce Value. Length values are depicted in Table 5.

Nonce Value: This field contains the actual nonce value.

TABLE 5

| Nonce Formats | | | |
|---|---|---|---|
| Format Identifier | Value (hex) | Length of value in Bytes | Type |
| Format 1 | 0001 | 256 | Unsigned Binary Integer |
| Other values | Reserved | | |

(4) SLAP_Acknowledge

The SLAP_Acknowledge is sent from the Responding_Switch to the Initiating_Switch. The format of the SLAP_Acknowledge dependent information is shown in Table 6.

TABLE 6

| SLAP_Acknowledge Dependent Information | |
|---|---|
| Item | Size Bytes |
| Transaction Identifier | 4 |
| Responding_Switch Nonce | x |
| Responding_Switch Signature | y |
| Responding_Switch Certificate | z |

Transaction Identifier: This field shall contain the 32 bit unsigned integer Transaction Identifier generated by the Initiating_Switch.

Responding_Switch Nonce: This field shall contain a nonce generated by the Responding_Switch. The format of the nonce is described in 1.2.2.1.

Responding_Switch Signature: This field shall contain the Signature generated by the Responding_Switch. The format of the Signature is described in 1.2.3.1.

Responding_Switch Certificate: This field shall contain the Certificate generated by the Responding_Switch. The format of the Certificate is described in Table 1.

(5) General Signature Format

The general Signature format is described in Table 7.

TABLE 7

| General Signature Format | |
|---|---|
| Item | Size Bytes |
| Signature Identifier | 2 |
| Signature Length | 2 |
| Signature Value | n |

Signature Identifier: This field identifies the format of the Signature. Valid Signature Identifiers are described in Table 8.

Signature Length: This field indicates the total length in bytes of the Signature Value. Length values are depicted in Table 8.

Signature Value: This field contains the actual Signature value.

TABLE 8

| Signature Formats | | | |
|---|---|---|---|
| Format Identifier | Value (hex) | Length of value in Bytes | Type |
| Format 1 | 0001 | 128 | RSA Encrypted SHA-1 |
| Other values | reserved | | |

Format 1 Signature Contents: The Format 1 Signature used by SLAP consist of a Signed nonce. In this case a hash of the nonce is generated using the SHA-1 algorithm. The has is then encrypted using the RSA private key belonging to the sending Switch.

(6) General Certificate Format

The general Certificate format is described in Table 9

TABLE 9

| General Certificate Format | |
|---|---|
| Item | Size Bytes |
| Certificate Identifier | 2 |
| Certificate Length | 2 |
| Certificate Value | n |

Certificate Identifier: This field identifies the format of the Certificate. Valid Certificate Identifiers are described in Table 10.

Certificate Length: This field indicates the total length in bytes of the Certificate Value. Length values are depicted in Table 10.

Certificate Value: This field contains the actual Certificate value.

TABLE 10

| Certificate Formats | | | |
|---|---|---|---|
| Format Identifier | Value (hex) | Length of value in Bytes | Type |
| Format 1 | 0001 | 1024 | X.509V3 |
| Other values | Reserved | | |

Format 1 Certificate Contents:

The Format 1 Certificates used in the SLAP protocol is compatible with the X.509V3 standard. Information contained in the Certificate includes the following:

Distinguished Switch_Name: conforms to the Distinguished Name (DN) format shown below:

"c=US, o=<Manufacturer Name(e.g. Brocade Communications Systems, Inc.)>, cn=<Switch_Name>"

where abbreviations are interpreted as:

c—country
o—organization
cn—common name

Public Key of the Switch: The public key of the Switch is an RSA 128 byte key.

(7) SLAP_Confirm

The SLAP_Confirm is sent from the Initiating_Switch to the Responding_Switch. The format of the SLAP_Confirm dependent information is shown in Table 11.

TABLE 11

SLAP_Confirm Information

| Item | Size Bytes |
| --- | --- |
| Transaction Identifier | 4 |
| Initiating_Switch Signature | X |
| Initiating_Switch Certificate | Y |

Transaction Identifier: This field shall contain the 32 bit unsigned integer Transaction Identifier generated by the Initiating_Switch.

Initiating_Switch Signature: This field shall contain the Signature generated by the Initiating_Switch. The format of the Signature is described in 1.2.3.1.

Initiating_Switch Certificate: This field shall contain the Certificate generated by the Initiating_Switch. The format of the Certificate is described in 1.2.3.2.

(8) SLAP_Done

The SLAP_Done is sent from the Repsonding_Switch to the Initiating_Switch. The format of the SLAP_Done dependent information is shown in Table 12.

TABLE 12

SLAP_Done Information

| Item | Size Bytes |
| --- | --- |
| Transaction Identifier | |

Transaction Identifier: This field shall contain the 32 bit unsigned integer Transaction Identifier generated by the Initiating_Switch.

(9) SLAP_Reject

The SLAP_Reject is sent from one switch to another to indicate that the SLAP has completed unsuccessfully. The format of the SLAP_Reject dependent information is shown in Table 13.

TABLE 13

SLAP_Reject Information

| Item | Size Bytes |
| --- | --- |
| Null | 0 |

F. Extending SLAP Beyond Switches

The example just above provides details for SLAP, which is a mechanism whereby two E_Ports are mutually authenticated. The concepts of SLAP, as explained earlier, apply far beyond E_port authentication. Therefore, some further illustration is provided here for a more specific use of the innovative authentication concepts in the Fibre Channel environment. Specifically, the following discussion summarizes FCAP, which is an acronym for Fibre Channel Authentication Protocol. Putting all in context, the innovative authentication techniques described herein are an aspect of the overall security innovations proposed. FCAP and SLAP are implementations of the authentication techniques, although SLAP is a specific application of the FCAP.

Basic Requirements of the FCAP

Some FCAP embodiments, just as some SLAP embodiments, consists of four different phases: (i) FCAP_Request; (ii) FCAP_Acknowledge; (iii) FCAP_Confirm; and (iv) FCAP_Done.

However, in addition to the four phases described above, FCAP also defines a FCAP_Reject operation. The protocol for FCAP is the same as the protocol defined by SLAP, so FIG. 9 is instructive. Each entity involved in a FCAP authentication process: obtains a certificate that may be verified by the other entity involved in the authentication process; is able to generate or obtain a random number or nonce; is able to generate and verify a signature based on the random number or nonce; and, has an Identifier that uniquely identifies itself (this Identifier is contained in the entities' certificate).

FCAP and End Device Authentication

The FCAP can be used to authenticate end-devices attached to the Fabric. There are two possible ways this can occur: (i) end-device to Fabric; and (ii) client to well-known server. In the case of end-device to Fabric authentication, the end-device itself is authenticated with respect to the Fabric. This strengthens the access control mechanisms that can be applied between the end-device and the Fabric.

In order to perform end-device to Fabric authentication, some embodiments require that the FCAP occur between the end-device and the Fabric before or during FLOGI. This is because the Switch uses the WWN of the end-device during FLOGI processing. The benefit of performing the FCAP prior to FLOGI is that the existing FLOGI will not have to be modified. In this case a the invention calls for a new FCAP ELS to be defined and used prior to the FLOGI request. The FCAP interactions would then complete successfully before a FLOGI is initiated by the end-device. In those embodiments, if the FLOGI was initiated prior to the FCAP running, then the FLOGI would be rejected by the Switch. In other embodiments, where the FCAP is not performed prior to FLOGI, the invention proposes a new Secure_FLOGI be defined.

This new Secure_FLOGI essentially includes the FCAP and normal FLOGI functions in one set of operations. This may require that the Secure_FLOGI consist of at least four interactions between the end-device and the Fabric.

For client to well-known server authentication, the client must be authenticated with respect to the well-known server. Currently well-known servers provide capabilities such as unzoned views of the Fabric and the ability to configure zoning information. This requires that the originator of the well-known server request be authenticated prior to any operations being accepted by the well-known server. To authenticate the client with respect to the well-known server, the FCAP is required to run prior to any well-known server request being issued. To accommodate this requirement, the invention proposes that the FCAP run immediately following the Login to the well-known server. If a well-known server request were issued and the FCAP had not completed successfully, then the request should be rejected.

FCAP Modification: A Key Agreement

The invention further proposes a modification to FCAP such that a key agreement mechanism is provided between two entities. This would allow the two entities to share a common secret key that could be used for encryption or message digest calculation. The key agreement mechanism could be used (i) between switches, (ii) between end-devices and Fabrics, or, (iii) between clients and well-known servers. For example, the Common Transport (FCCT) provides for a message digest in its extended header that can be used to guarantee message integrity. However, the standard does not specify how the client and the well-known server acquire and agree on the common secret key required by both entities to generate the message digest. FCAP could be modified such that as part of the client to well-known server authentication, a common key can be agreed upon. An algorithm such as Diffie-Hellman could be used. This would allow the client and the well-known server to make use of the message digest in the FC-CT header, which would guarantee integrity for the well-known service messages.

IX. Security Time Service

A. Generally

The sixth very general aspect of security to be discussed is security time service. In a network, a distributed secure time service can provide many important advantages. As an example, networks using secure time stamps can generally prevent replay attacks because the attacker's replay will be inappropriately (or, at least suspiciously) time stamped. Furthermore, distributed time keeping in general allows for enhancements to (i) error logging or reporting, (ii) event logging or reporting. The result is the ability to perform all levels of data and network management in an enhanced manner. For example, distributed time service allows for event correlation and distributed lock management.

As discussed several times now, the innovations disclosed here are born in the area of Fibre Channel networking but may apply in a much wider array of networking and computing environments. Nevertheless, given the origins, one skilled in the art may realize that an underlying time service exists in the specification by the American National Standard for Information Technology ("ANSI"), Fibre Channel-Genaric Services-2 (FC-GS-2), approved Oct. 14, 1999, incorporated herein by reference, in its entirety. The following few paragraphs will explain some of the ANSI standard for time service, in order to provide context and contrast for the innovations described.

The functional model for the ANSI time service provides two primary entities, a time service client and a time service server. The client is the entity representing a user accessing the time service. Therefore, in a Fibre Channel network, the client service is a task running on every switch. The server is the entity that provides the time information. According to the specification, there may be more than one time server in the network. However, from a client's perspective, the time service appears to come from the entity that is accessible at the "well-known" time service address identifier.

The basic ANSI time service protocol is a pull model because interaction is initiated when the client requests time information from the server by using the Get_time command. The server then responds with a Get_time Response.

The ANSI specification does not provide a standard or mechanism for distributed time service other than to set a plus-or-minus 2 second tolerance, if such a distributed service is implemented.

B. Distributed Time Service—Generally

In order to create a secure distributed time service, there must first be a mechanism for a distributed time service (recall that none is specified by the ANSI specification). In general, the invention proposed a push model distributed time service, wherein all the entities in the network run a time-service client, only one designated entity in the network runs a time service server and thereby has a leadership position with respect to time and those leadership entities bear the responsibility of distributing the time. An embodiment of this concept may be seen in FIG. 13.

Figure 13:
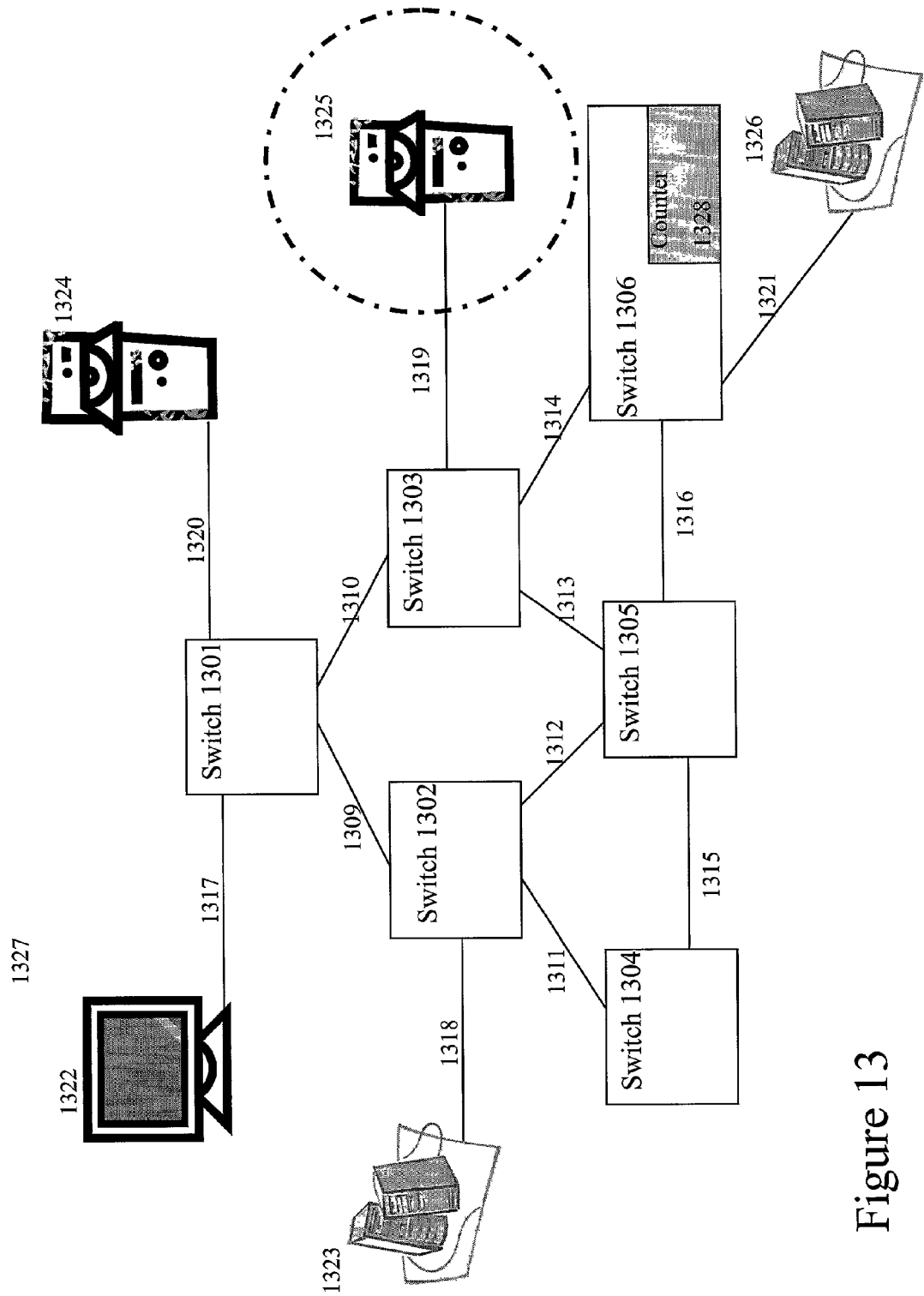
FIG. 13 shows a exemplary network using time service.

Referring to FIG. 13, there is shown terminal 1322 used to communicate management commands with switch 1301. Also shown are: server 1324 coupled to switch 1301; server 1325 coupled to switch 1303; storage device 1326 coupled to switch 1306, such switch containing counter 1328; switches 1305, 1304, and 1302; and storage device 1323. Sever 1325 is the primary entity in the network for time service purposes so in a general sense, server 1325 is responsible for distributing the time to all the other entities in the fabric. Clearly, sever 1325 cannot distribute the time directly to all entities, for example storage device 1323 or switch 1304. Therefore, it is appropriate to route the time messages through other entities in the network. While most embodiments transfer the time information in-band (through the data path), some embodiments use the management channels or any other available mechanism for communicating with the other entities.

In a non-secure mode, some embodiments of the invention allow for updating the time at any entity in the network. Therefore, using terminal 1322, an operator may update the time on switch 1301. Some embodiments allow for such and update to be initiated by a software command such as the command, "DATE." Regardless of how initiated, if there is an update to switch 1301, the invention calls for switch 1301 to route the updated time to the primary entity, (server 1325), after which, the primary entity (server 1325) will disperse the update to all entities in the network.

In some embodiments, the time information forwarded is in the format Universal Time Coordinated ("UTC"). UTC is a well known format that represents time in the number of seconds elapsed since Jan. 1, 1970. Of course, the time information may be sent in any decipherable form. Furthermore, since the invention allows for an entity to cognize time zones, UTC is very convenient because the time zone may be indicated by a number minus 12 to plus 12, relative to UTC. However, since networks may span several time zones, the time zone indicator is specific to an entity and not network-wide.

Some embodiments call for the time information updates to come from the primary entity in periodic fashion. Therefore, if the period is T1 seconds, then every T1 seconds the primary entity will propagate the time throughout the network. In some embodiments, T1 is 64 seconds.

In some embodiments, when a non-primary entity receives time information from the primary entity, it records the time or starts a counter and then it updates it's own time information. The started counter (or recorded time of arrival) may be used for many purposes. One notable purpose is to validate (in some respect) the incoming time update. To do this, the non-primary entity determines the elapsed time between time indicated by the received time information (Ts–time sent) and the time of receipt (Tr–time received). This difference (Tr–Ts) represents the propagation time for the information. If that propagation time is in excess of the maximum propagation time allowed by the network, then the time update is disregarded.

Another notable use for starting a counter at the time of an update arrival is used in conjunction with the concept of period, T1. If a non-primary entity has not received an update in over one period T1, then the switch should know that its time may not have been appropriately updated. In some embodiments, if an update has not been received in a period of two times T1 or more, the entity marks itself as unsynchronized. Of course, the entity may continue to operate, but without any benefit of distributed time.

In connection with the foregoing, in some embodiments of the invention, a non-primary entity will perform a periodic check of the elapsed time since the last time information update. The non-primary entity may perform this check on any interval, but the shorter the interval, the earlier any error can be noted. Assume, for this example, that the non-primary entity performs this check on an interval of T2, which is approximately equal to T1. When performing the check, the non-primary entity will examine how much time has past since the most recent time information update from the primary entity. For this reason, the non-primary entity requires a threshold tolerance for determining what is the tolerable length of elapsed time. Assume this tolerance level is T3. Therefore, if the non-primary entity discovers that T3 or more time has elapsed since its last time information update, it will know that its time may be unreliable and may mark itself as unsynchronized. In some embodiments, T3 is greater than T1 because, there it is prudent to wait at least one broadcast period before checking the age of the most recent update broadcast. In some embodiments, T3 is double T1. For illustration the following example, refers to FIG. 13 wherein, primary entity 1325 updates time information to switch 1306 at time T0. At that time, switch 1306 starts counter 1328. After waiting a period of T2 (in this case equal to T1 plus 1 second), switch 1306 will check the counter for how much time has elapsed since the last time information update from primary entity 1325. If the elapsed time is greater than T3 (in this case equal to 2 times T1), then switch 1306 will mark itself unsynchronized. However, after the elapse of only T1+1 seconds, the T3 condition will not be met. Therefore, switch 1306 will wait another T2 seconds and check elapsed time again. This time, if there has been no update, switch 1306 will find that greater than T3 seconds has elapsed and switch 1306 will mark itself unsynchronized.

C. Distributed Time Service—Switches In A Fabric

The invention contemplates the use of the foregoing distributed time service concepts in a Fibre Channel fabric wherein only the Fibre Channel switches keep and control the time. In some embodiments, the primary entity will be the fabric principle switch. Like the general embodiments described above, some of the fabric embodiments use UTC time with allowance for time zones and virtually all embodiments use SNTP (simple network time protocol).

Figure 14:
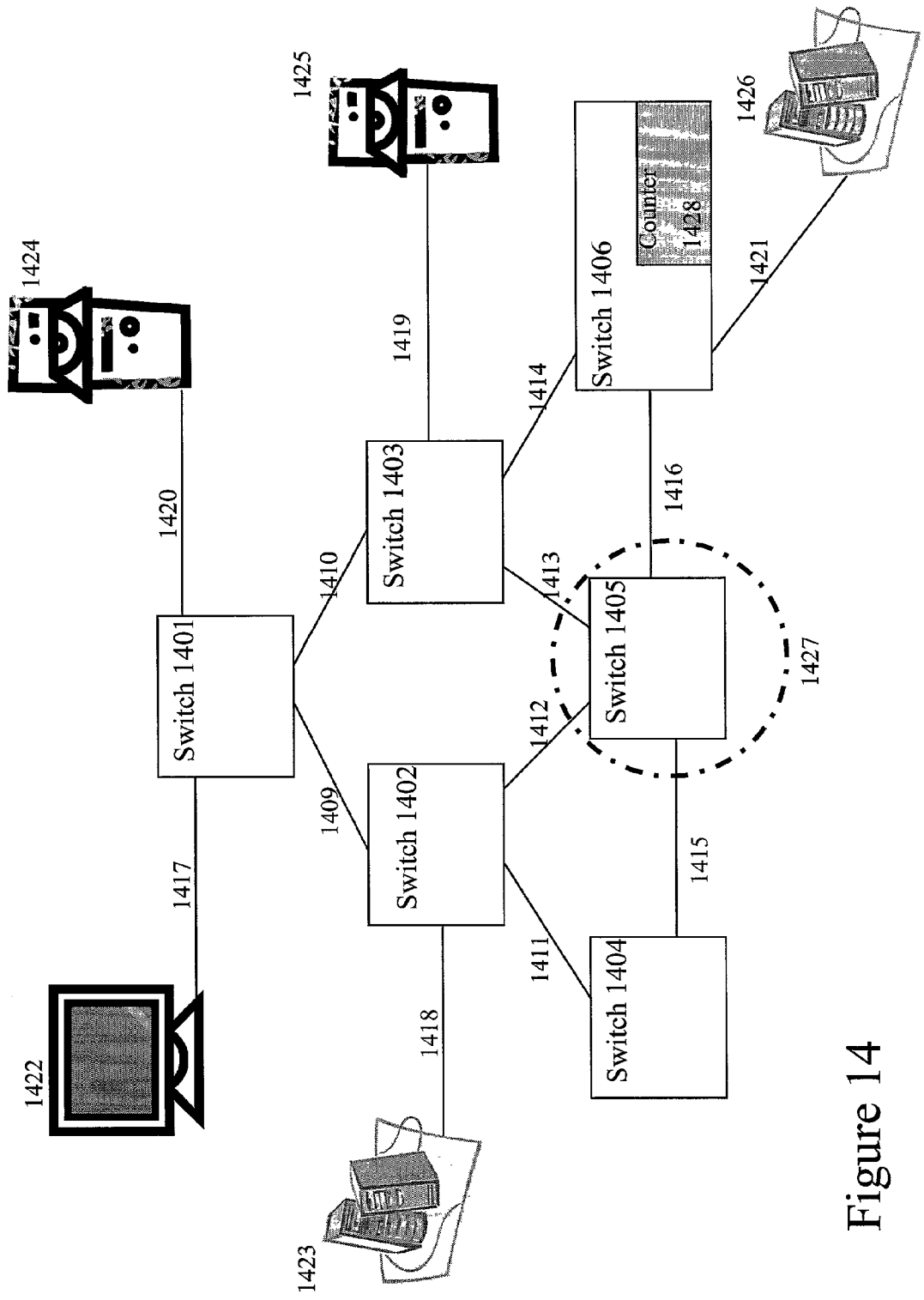
FIG. 14 shows a Fibre Channel fabric.
Figure 15:
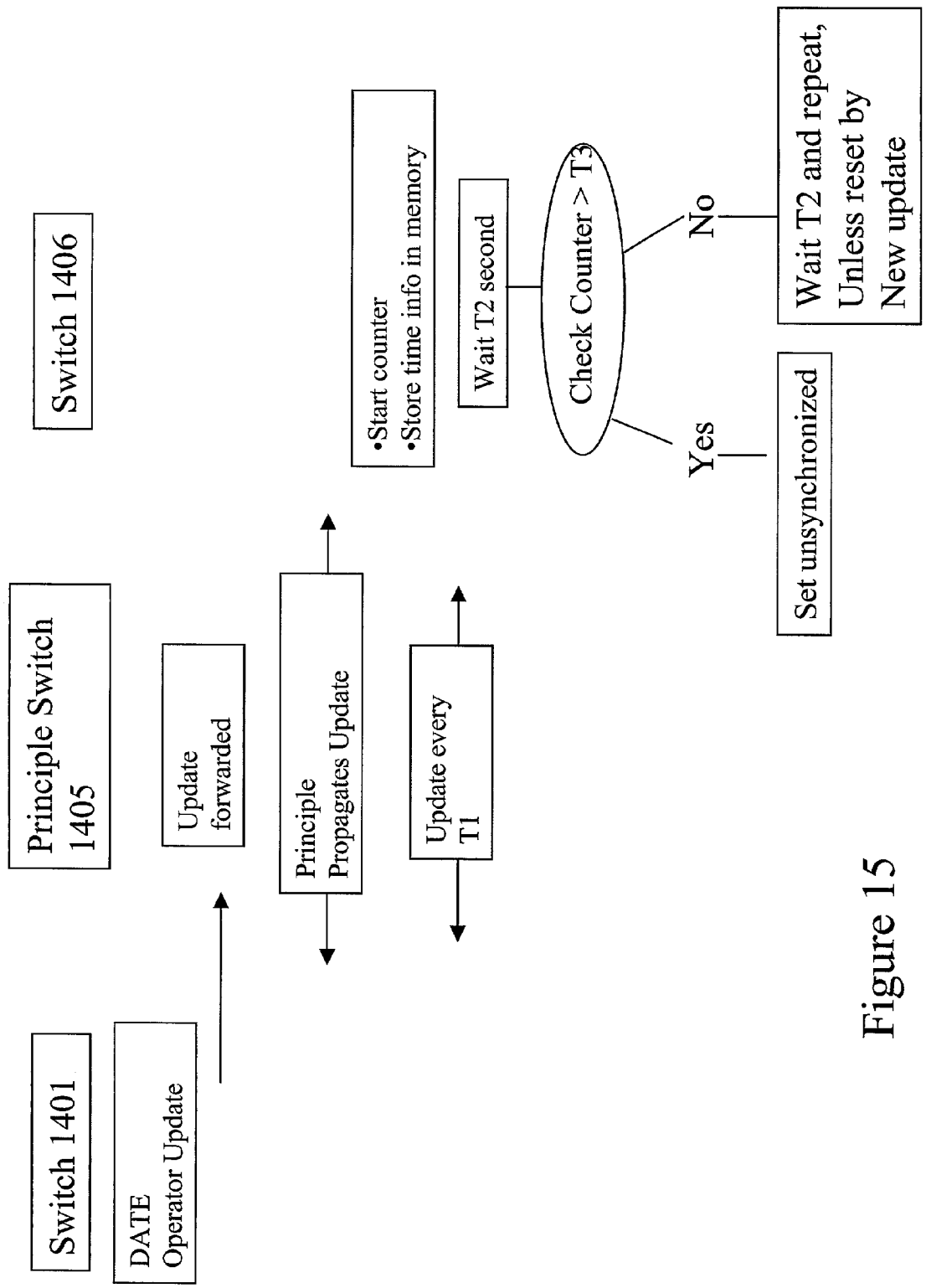
FIG. 15 shows distributed time service interaction between devices.

Referring now to FIG. 14, in connection with FIG. 15, there is shown in FIG. 14 a Fibre Channel fabric similar to the network of FIG. 13. There is shown in FIG. 15 the actions of three devices, switch 1401, switch 1405 and switch 1406 in some of the embodiments to be discussed. Referring again to FIGS. 14 and 15, assume that switch 1405 is the principle switch and that a DATE command is used on switch 1401 through the use of terminal 1422. The operator uses the DATE command to update time on switch 1401. Since switch 1401 is not the principle switch, the invention calls for the update to be forwarded to the principle switch 1405. Principle switch 1405 then updates all the switches in the fabric upon its regular update interval, which is every T1 seconds. Being in the fabric, switch 1406 is among those that receive the update. Upon receipt of the time information update, switch 1406 starts its counter 1428 and stores the update time information in memory. The memory may be of any type although many embodiments use a non-volatile form of memory. Switch 1406 waits for T2 seconds from the time it started its counter and then it checks how much time has elapsed since its last time information update (Te—time elapsed). Switch 1406 will compare Te with a pre-determined threshold time, T3, that represents the system designer's tolerance for distributed time inaccuracy. In some embodiments T3 has been chosen to be two times T1. Assuming T2 is about the same or slightly greater that T1, under normal circumstances, little or no time will have elapsed since the last time update (this is because, under normal circumstances, the invention calls for principle switch 1405 to update switch 1406 every T1 seconds). In this case, switch 1406 will simply wait another T3 seconds and make a fresh compare. Switch 1406 will do this over and over again unless there is an anomaly in the system, and the elapsed time Te is greater than T3. In that case, as indicated in FIG. 15, switch 1406 will set itself as un-synchronized Having a accurate time synchronized with the remainder of the fabric allows switch 1406 to time stamp information so that enhanced functions of the types previously described, may be implemented. For example, management and security information such as policies may be time stamped. Of course, data packets or frames may be time stamped as well, although only in very specific embodiments.

D. Secure Distributed Time Service—Generally

Having discussed a distributed time service, the disclosure now moves to the securing of that time service. Like the non-secure distributed time service, the invention allows for generic use of secure distributed time service across multiple entities in different types and even heterogeneous networks. In this general sense, the secure distributed time service works as described above with the following caveats: (i) rather than a primary entity, a Network Configuration Entity (as described much earlier) serves as the only eligible source of time updates; (ii) time updates may only be made on the NCE (the DATE command will not work on other entities in the network; and (iii) the time is forwarded by the NCE with a security or verification device such as the derivation schemes, signing or encryption all discussed much earlier. Other details about generic application of secure distributed time service will be easily inferred from the more detailed discussion of the fabric.

E. Secure Distributed Time Server—Fabric

Referring to FIG. 12, primary FCS is the only entity in the fabric that may change or distribute time. According to most embodiments, the other switches in the fabric will not accept time changes from any other entity. However, any of the switches may service time requests by various hosts or non-switch entities.

In some embodiments, in order to secure the time information update, the primary FCS signs the update with its private key. Recall that an FCS is a trusted switch in the fabric designated in many embodiments as the first on the FCS policy list. Recall also that signing is a PKI-based verification and authentication technique (explained in detail much earlier). By using a signed time update, the primary FCS allows the receiving switches to verify the signature (as done with respect to FCS generally—discussed much earlier) before accepting the update.

Since, these implementations intertwine the FCS and secure distributed time service, the notion of sequencing becomes relevant. In some embodiments, when secure mode is activated, the primary FCS first checks the fabric to assure that all devices are capable of participating in a secure fabric. Once that is confirmed, the primary FCS distributes its certificate (including its public key, which is used to verify its signature) to all the switches in the fabric. After this, the time server task running on the primary FCS sends its first time update. Having received the certificate first, the switches in the fabric are equipped to receive a distributed secure time update. FCS policy and version stamp are downloaded from the primary FCS to the other fabric members. Since the time update preceded the policy download, the policies may be time stamped. (After downloading the FCS policy, the primary FCS does a fast boot of all the switches causing SLAP on all e-ports and policies downloaded to all switches.)

This sequence is altered in the case that a switch is powered on to enter a fabric wherein security is already enabled. In that case, the switch must complete its authentication process (e.g. SLAP) before it will receive its first time update from the primary FCS then all policies, zoning, password, and community strings.

Figure 16:
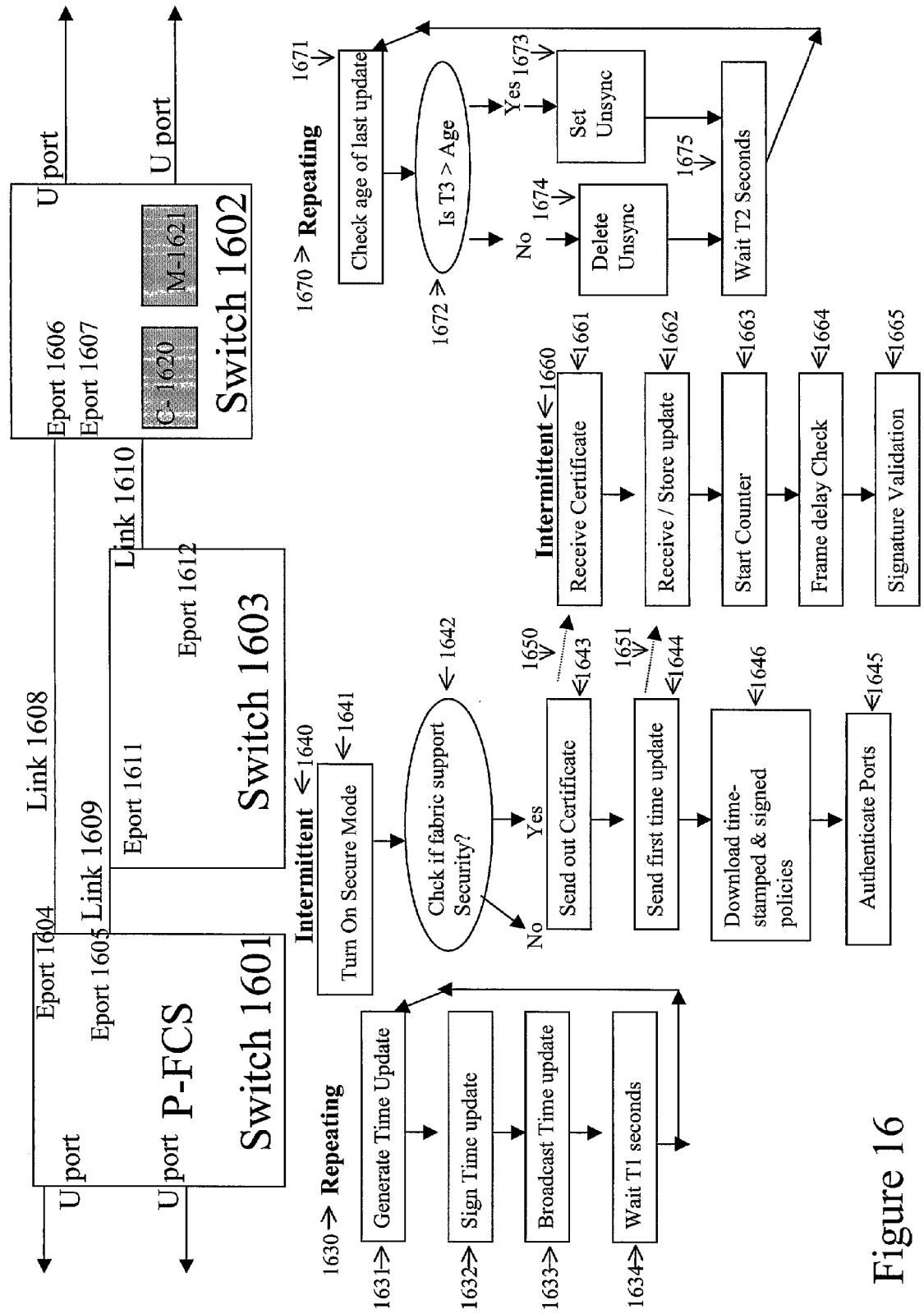
FIG. 16 shows hardware and process steps for embodiments of secure distributed time service.

Referring to FIG. 16, there is shown the hardware and process steps for an example of secure distributed time service under the invention, using a PKI infrastructure and in a 3 switch fabric. The two process charts 1630 and 1640 represent the basic process steps for the primary FCS in a repeating process and an intermittent process respectively. The two process charts 1660 and 1670 represent the basic process steps for a client switch 1602 in an intermittent and repeating operation respectively. The arrows 1650 and 1651 represent communication between the FCS 1601 and the client 1602. FIG. 16 also shows switch 1603 and links 1608, 1609 and 1610 comprising the fabric.

Referring again to FIG. 16, an instance of the time service client is running in switch 1603 and switch 1602 (for a brief discussion of the switch hardware, see the discussion regarding same, much earlier). Furthermore, and instance of the time service server is running on primary FCS, switch 1601. Referring now to intermittent process stack 1640, when secure mode is turned on in the fabric (typically through P-FCS 1601, the FCS first checks to see if the fabric is capable of security mode, meaning all devices to be included in the secure fabric must have the appropriate hardware and software versions. If the fabric is not capable, then the secure mode does not activate. If the fabric is capable the FCS sends its certificate out to all the switches in the fabric (1643), which in this case comprise switches 1602 and 1603. Since switch 1602 and 1603 will behave identically in most embodiments, here forward reference is only made to switch 1602.

Jumping now to intermittent stack 1660 switch 1602 receives the certificate and stores it in a memory, which in many embodiments is volatile memory 1621. Jumping back to stack 1640, FCS 1601 next sends out the first time update. The update is signed using the FCS 1601 private key. Jumping back to stack 1660, switch 1602 receives the signed time stamp and stores it in a memory, which in most embodiments is volatile memory 1621. In conjunction with storing the update, switch 1602 will also note and store the time of arrival of the update). Switch 1602 will also, virtually immediately start a counter (1663) that will measure the age of the received update (the counter value being equal to the age and represented by Ta). In most embodiments the counter is a software task that exploits a hardware counter, which is all represented by counter 1620. If the Ta counter is already running when the time update is received, then it is re-started. Switch 1602 then may perform a frame delay check 1664 on the received update. In particular, switch 1602 will determine the difference between the stored time of arrival and the update time. If that difference is greater that a maximum expected frame transfer latency, the operation is terminated a failure. Typically, the ANSI specification is used to determine maximum expected frame transfer latency. Whether or not the Frame delay check 114 is used, switch 1602 will always verify the signature of FCS 1601. To do this, switch 1602 will use the FCS 1601 public key received earlier with the FCS 1601 certificate. If the signature validates, then the time stamp is accepted. If the signature does not validate, then the time update is considered invalid and discarded.

Jumping back to stack 1640, after sending the first update, FCS 1601 will go forward downloading time-stamped and signed policies to the other switches in the fabric. Next, FCS may proceed with authentication of port 1645 (like SLAP—explained earlier.

Looking now at the repeating FCS operation 1630, FCS 1601 will generate a time update every T1 seconds. The wait period T1 is shown as the last step in the process, but differing embodiments of the invention place the wait period first, second, third or between any other two steps. Following the process as shown in FIG. 16, FCS 1601 generates a time update 1631, and in some embodiments stores it in a memory. FCS 1601 then signs the update 1632 and distributes it to the fabric devices 1633. Finally, FCS 1601 waits T1 seconds and then begins the process again, resulting in a repeating update being distributed every T1 seconds. In some embodiments, T1 is equal to 64 seconds.

Looking now at switch 1602 repeating process represented in stack 1670, the clients in the secure distributed time system will monitor the age of their most recent update and assume that their time is out of synchronization if their update is too old. In this example, switch 1602 checks the age of its time update, Ta, every T2 seconds. As in the FCS repeating process, the T2 waiting step 1675 is shown at the end, but may occur in the beginning or middle of the process. Referring then to the process 1670 as drawn, switch 1602 will check the age, Ta, of its last time update by determining if T3 is greater than Ta. T3 is a specifically defined threshold value that the system designer or operator has determined to be too long since the last update. If T3 is greater than Ta, then switch 1602 will set itself unsynchronized and proceed to wait step 1675. If T3 is less than Ta then switch 1602 will reset any previous marking of unsynchronization and proceed to wait step 1675. Wait step 1675 provide for a wait of T2 seconds. T2 is the interval upon which switch 1602 will check the age of its time update. Therefore, most embodiments set T2 equivalent to or greater than T1. However, a designer may wish to set T2 much lower or higher based upon the mechanisms that might cause an unsynchronized condition to occur in any specific system.

F. Host and Other Operations

A host in the system may query for the time from any switch in the network. The switch will return the time and the host may synchronize to the fabric time by setting its local time based on the roundtrip delay calculated using the information in the payload of the switches response.

In secure mode, an operator may see the time on any switch in the network using the DATE command, however, only the primary FCS allows operand to alter the time.

X. Non Limitation

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

The invention claimed is:

1. A network configuration entity comprising:
a processor; and
a memory for storing
an NCE list, said NCE list comprising an indication of each device in the network that may operate as said network configuration entity,
an SCC list, said SCC list comprising an indication of each device allowed to participate in said secure network,
a DCC list, said DCC list associated with said one or more rules for interaction between and among devices and comprising definitions that logically bind a port on the network configuration entity, to one or more other ports resident in the secure network, and,
a MAC list, said MAC list comprising an indication of network endpoints from which management access is acceptable.

2. A switching device comprising:
a processor; and
a memory for storing
a list of entities eligible to be a primary network configuration entity, wherein the primary network configuration entity has exclusive control of one or more security functions, one of the entities on said list being a default primary configuration entity and identifiable as such by a pre-defined rule, and
a network configuration policy set, said network configuration policy set comprising,
zoning information defining members of the logical zones in said physical network, and
fabric segmentation information defining management procedures to be implemented in the event that said network switch becomes a member of a segmented portion of the network.

3. A switching device comprising:
a processor; and
a memory for storing
a list of entities eligible to be a primary network configuration entity, wherein the primary network configuration entity has exclusive control of one or more security functions, one of the entities on said list being a default primary configuration entity and identifiable as such by a pre-defined rule, and
MAC policies, said MAC policies defining logical channels from which a pre-defined set of security or management operations may originate.

4. A method of securing a network, said method comprising:
controlling the recognition, operation and succession of the network configuration entity by designating an NCE list comprising an indication of each device in the network that may operate as said network configuration entity;
designating a unique name for each devices that may participate in the secure network;
indicating port relationships in said secure network to specifically delineate a list of unique names for ports that any given port may communicate with; and
restricting management access to a pre-defined set of access methods.

5. The network configuration entity of claim 1 wherein the network configuration entity is a switching device.

6. The network switch of claim 2 further wherein the memory further stores MAC policies, said MAC policies defining logical channels from which a pre-defined set of security or management operations may originate.

7. The network switch of claim 2 wherein the one or more security functions comprise specifying devices that may facilitate management-level access to the network.

8. The network switch of claim 2 wherein the one or more security functions comprise providing confidentiality or information security for management information being passed over the network.

9. The network switch of claim 2 wherein the one or more security functions comprise limiting use of logical management access channels.

10. The network switch of claim 2 wherein the one or more security functions comprise specifying what devices or entities are allowed in the network.

11. The network switch of claim 2 wherein the one or more security functions comprise specifying what entities are allowed to access what other entities in the network.

12. The network switch of claim 2 wherein each entity on the list of entities eligible to be a primary network configuration entity is assigned a level in an authority hierarchy.

13. The network switch of claim 12 wherein only one entity on the list of entities eligible to be a primary network configuration entity is assigned to the highest level of the authority hierarchy.

14. The network switch of claim 12 wherein entities assigned to lower levels of the authority hierarchy have exclusive control of only a subset of the one or more security functions.

15. The network switch of claim 3 wherein the one or more security functions comprise specifying devices that may facilitate management-level access to the network.

16. The network switch of claim 3 wherein the one or more security functions comprise providing confidentiality or information security for management information being passed over the network.

17. The network switch of claim 3 wherein the one or more security functions comprise limiting use of logical management access channels.

18. The network switch of claim 3 wherein the one or more security functions comprise specifying what devices or entities are allowed in the network.

19. The network switch of claim 3 wherein the one or more security functions comprise specifying what entities are allowed to access what other entities in the network.

20. The network switch of claim 3 wherein each entity on the list of entities eligible to be a primary network configuration entity is assigned a level in an authority hierarchy.

21. The network switch of claim 3 wherein only one entity on the list of entities eligible to be a primary network configuration entity is assigned to the highest level of the authority hierarchy.

22. The network switch of claim 3 wherein entities assigned to lower levels of the authority hierarchy have exclusive control of only a subset of the one or more security functions.

* * * * *